United States Patent
Boules et al.

(10) Patent No.: US 6,498,451 B1
(45) Date of Patent: Dec. 24, 2002

(54) TORQUE RIPPLE FREE ELECTRIC POWER STEERING

(75) Inventors: Nady Boules, Troy, MI (US); Rassem Ragheb Henry, Clinton Township, MI (US); Chandra Sekhar Namuduri, Troy, MI (US); Thomas Wolfgang Nehl, Shelby Township, MI (US); Bruno Patrice Bernard, Lequesne, MI (US); Shaotang Chen, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/656,116

(22) Filed: Sep. 6, 2000

(51) Int. Cl.$^7$ .................................................. G05B 1/16
(52) U.S. Cl. ........................ 318/661; 318/254; 318/715
(58) Field of Search ................................ 318/254, 138, 318/661, 685, 715; 310/44, 45, 46

(56) References Cited

U.S. PATENT DOCUMENTS

| | | | |
|---|---|---|---|
| 3,898,544 A | | 8/1975 | Tanikoshi |
| 3,919,609 A | | 11/1975 | Klautschek et al. |
| 4,027,213 A | * | 5/1977 | De Valroger ................. 318/138 |
| 4,135,120 A | | 1/1979 | Hoshimi et al. |
| 4,217,508 A | * | 8/1980 | Uzuka ........................ 310/46 |
| 4,240,020 A | | 12/1980 | Okuyama et al. |
| 4,392,094 A | * | 7/1983 | Kühnlein ..................... 318/254 |
| 4,447,771 A | * | 5/1984 | Whited ....................... 318/254 |
| 4,511,827 A | | 4/1985 | Morinaga et al. |
| 4,556,811 A | | 12/1985 | Hendricks |
| 4,558,265 A | | 12/1985 | Hayashida et al. |
| 4,628,499 A | | 12/1986 | Hammett |
| 4,633,157 A | | 12/1986 | Streater |
| 4,686,437 A | | 8/1987 | Langley et al. |
| 4,688,655 A | | 8/1987 | Shimizu |
| 4,745,984 A | | 5/1988 | Shimizu |
| 4,780,658 A | | 10/1988 | Koyama |
| 4,789,040 A | | 12/1988 | Morishita et al. |
| 4,814,677 A | | 3/1989 | Plunkett |
| 4,835,448 A | | 5/1989 | Dishner et al. |
| 4,837,692 A | | 6/1989 | Shimizu |
| 4,868,477 A | | 9/1989 | Anderson et al. |
| 4,868,970 A | | 9/1989 | Schultz et al. |
| 4,882,524 A | * | 11/1989 | Lee ............................. 318/254 |
| 4,912,379 A | | 3/1990 | Matsuda et al. |

(List continued on next page.)

OTHER PUBLICATIONS

IEEE, Low Cost Phase Current Sensing in DSP Based AC Drives, Francesco Parasiliti, et al., 7/99.
IEEE, Single Current Sensor Technique in the DC Link of Three–Phase PWM–VS Inverters, Frede Blaabjerg et al., vol. 35, No. 5, Sep./Oct. 1997.
Conference Record of the IEEE Catalog No. 87CH2499–2, Oct. 18–23, 1987.
Conference Record of the IEEE Catalog No. 87CH2565–0, Oct. 2–7, 1988.
Brown Boveri Review, vol. 51, No. 8/9, Aug./Sep. 1964.
Power Electronics, vol. 8, Jan. 1993.
Power Electronics, vol. 8, Apr. 1993.
IEEE Translations on Industry Applications, vol. 25, Jan./Feb. 1989.

*Primary Examiner*—Khanh Dang
(74) *Attorney, Agent, or Firm*—Edmund P. Anderson

(57) ABSTRACT

Disclosed is an electric motor system with reduced torque ripple comprising a sinusoidally magnetized permanent magnet, a sinusoidal inverter, a higher resolution position sensor, a composite iron stator yoke, a composite reinforced plastic rotor core and shaft; and a high gear ratio gear reduction box. The novel combination of magnet, inverter, sensor, plastic rotor core and shaft and high gear ratio gear box substantially reduces the torque ripple on the shaft of said motor system.

74 Claims, 14 Drawing Sheets

U.S. PATENT DOCUMENTS

| | | | |
|---|---|---|---|
| 4,988,273 A | 1/1991 | Faig et al. |
| 4,992,717 A | 2/1991 | Marwin et al. |
| 5,006,774 A | 4/1991 | Rees |
| 5,040,629 A | 8/1991 | Matsuoka et al. |
| 5,063,011 A | 11/1991 | Rutz et al. |
| 5,069,972 A | 12/1991 | Versic |
| 5,076,381 A | 12/1991 | Daido et al. |
| 5,122,719 A | 6/1992 | Bessenyei et al. |
| 5,223,775 A | 6/1993 | Mongeau |
| 5,239,490 A | 8/1993 | Masaki et al. |
| 5,331,245 A | 7/1994 | Burgbacher et al. |
| 5,345,156 A | 9/1994 | Moreira |
| 5,349,278 A | 9/1994 | Weeden |
| 5,361,210 A | 11/1994 | Fu |
| 5,428,285 A | 6/1995 | Koyama et al. |
| 5,433,541 A | 7/1995 | Hieda et al. |
| 5,444,341 A | 8/1995 | Kneifel, II et al. |
| 5,460,235 A | 10/1995 | Shimizu |
| 5,461,293 A | 10/1995 | Rozman et al. |
| 5,467,275 A | 11/1995 | Takamoto et al. |
| 5,469,215 A | 11/1995 | Nashiki |
| 5,475,289 A | 12/1995 | McLaughlin et al. |
| 5,493,200 A | 2/1996 | Rozman et al. |
| 5,517,415 A | 5/1996 | Miller et al. |
| 5,554,913 A | 9/1996 | Ohsawa |
| 5,568,389 A | 10/1996 | McLaughlin et al. |
| 5,569,994 A | 10/1996 | Taylor et al. |
| 5,579,188 A | 11/1996 | Dunfield et al. |
| 5,585,708 A | 12/1996 | Richardson et al. |
| 5,616,999 A | 4/1997 | Matsumura et al. |
| 5,623,409 A | 4/1997 | Miller |
| 5,625,239 A | 4/1997 | Persson et al. |
| 5,642,044 A | 6/1997 | Weber |
| 5,656,911 A | 8/1997 | Nakayama et al. |
| 5,668,721 A | 9/1997 | Chandy |
| 5,672,944 A | 9/1997 | Gokhale et al. |
| 5,701,065 A | 12/1997 | Ishizaki |
| 5,739,650 A | 4/1998 | Kimura et al. |
| 5,760,562 A | 6/1998 | Woodland et al. |
| 5,777,449 A | 7/1998 | Schlager |
| 5,780,986 A | 7/1998 | Shelton et al. |
| 5,803,197 A | 9/1998 | Hara et al. |
| 5,811,905 A | 9/1998 | Tang |
| 5,852,355 A | 12/1998 | Turner |
| 5,867,380 A | 2/1999 | Lee |
| 5,881,836 A | 3/1999 | Nishimoto et al. |
| 5,898,990 A | 5/1999 | Henry |
| 5,919,241 A | 7/1999 | Bolourchi et al. |
| 5,920,161 A | 7/1999 | Obara et al. |
| 5,929,590 A | 7/1999 | Tang |
| 5,962,999 A | 10/1999 | Nakamura et al. |
| 5,963,706 A | 10/1999 | Baik |
| 5,977,740 A | 11/1999 | McCann |
| 5,984,042 A | 11/1999 | Nishimoto et al. |
| 5,992,556 A | 11/1999 | Miller |
| 6,002,226 A | 12/1999 | Collier-Hallman et al. |
| 6,002,234 A | 12/1999 | Ohm et al. |
| 6,008,599 A | 12/1999 | Beck |
| 6,009,003 A | 12/1999 | Yeo |
| 6,013,994 A | 1/2000 | Endo et al. |
| 6,034,460 A | 3/2000 | Tajima |
| 6,034,493 A | 3/2000 | Boyd et al. |
| 6,043,624 A | 3/2000 | Masaki et al. |
| 6,049,182 A | 4/2000 | Nakatani et al. |
| 6,104,150 A | 8/2000 | Oohara et al. |
| 6,129,172 A | 10/2000 | Yoshida et al. |
| 6,184,638 B1 | 2/2001 | Kinpara |
| 6,281,659 B1 | 8/2001 | Giuseppe |

\* cited by examiner

POSITION SENSOR SIGNALS

POSITION INITIALIZATION LOGIC

| H1 | H1 | H1 | ACTUAL POSITION | INITIALIZATION VALUE |
|---|---|---|---|---|
| 0 | 0 | 1 | 300-360° | 330° |
| 0 | 1 | 1 | 240-300° | 270° |
| 0 | 1 | 0 | 180-240° | 210° |
| 1 | 1 | 1 | 120-180° | 150° |
| 1 | 0 | 0 | 60-120° | 90° |
| 1 | 0 | 1 | 0-60° | 30° |

FIG. 14A  Current Waveform
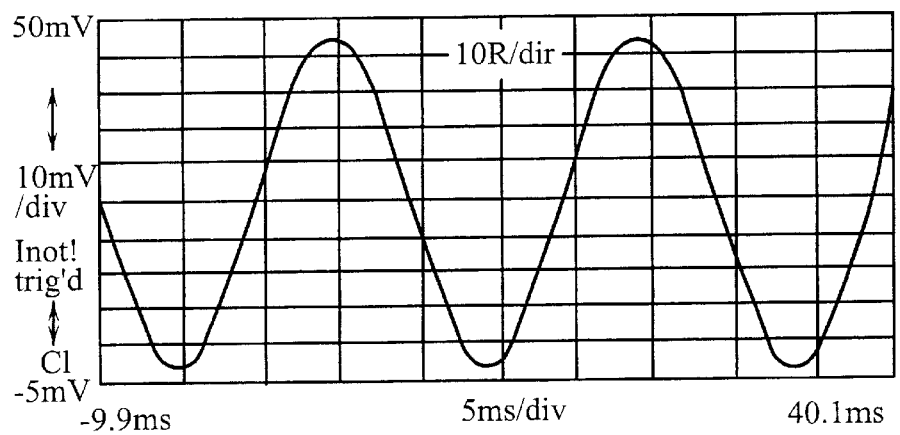
FIG. 14B  Frequency Spectrum
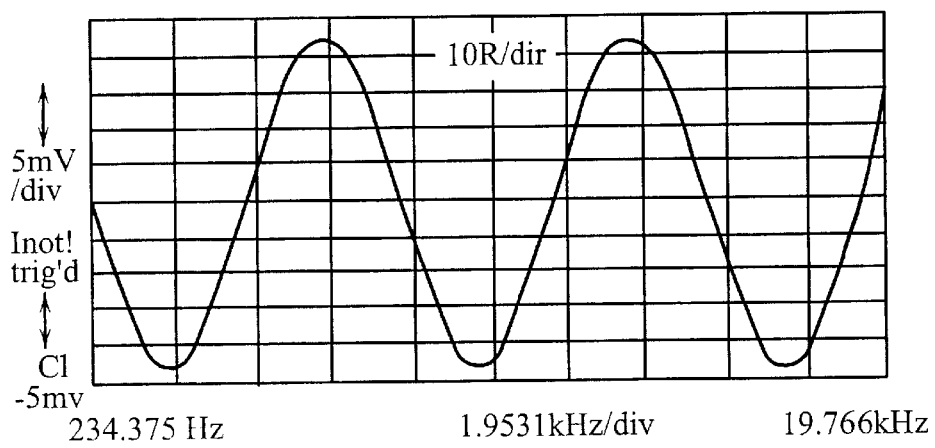

BASE-LINE MOTOR

MOTOR WITH
DOUBLE ISOLATION

TRF MOTOR

TORQUE RIPPLE FREE ELECTRIC POWER STEERING

TECHNICAL FIELD

The invention is directed to electric power steering systems, particularly towards a torque ripple free system for electric power steering.

BACKGROUND OF THE INVENTION

Electric power steering (EPS) has been the subject of development by auto manufacturers and suppliers for over a decade because of its fuel economy and ease-of-control advantages compared with traditional hydraulic power steering. However, commercialization of EPS systems has been slow and is presently limited to small and midget-class cars due to cost and performance challenges. Among the most challenging technical issues is the annoying pulsating feel at the steering wheel and the audible noise associated with the type of high performance electric drives needed to meet the steering requirements.

SUMMARY OF THE INVENTION

The so-called "Torque-Ripple Free" (TRF) system is an advanced electric drive concept, which was devised with the specific objectives of reducing the motor torque pulsation and audible noise in electric power steering systems to ultra-low levels comparable to those experienced in cars equipped with hydraulic power steering systems. In theory, and under ideal conditions, the new concept should produce no torque ripple at all, and hence the name. However, due to practical limitations discussed below, some low levels of torque ripple unavoidably remain.

The key elements of the TRF electric drive concept include:

(a) A sinusoidal drive to reduce commutation torque ripple to ultra-low levels. This is accomplished by:
  (1) A sinusoidal inverter/controller to switch currents into the three-phases to be in synchronism with the rotor at all times. The currents are controlled to have sinusoidal waveforms
  (2); Permanent magnets designed to produce a sinusoidal magnetic field distribution in the windings region of the machine, thus inducing voltages in the machine windings of sinusoidal waveforms, and
    A low cost, higher resolution position sensor to provide the controller with accurate rotor position information, necessary to control the current waveform to the desired sinusoidal shape.
(b) An electrical machine with slotless winding to eliminate both cogging torque and pulsating radial forces. FIG. 3 illustrates a schematic of the TRF motor cross-section for illustration.
(c) A composite iron stator yoke to replace laminated yoke and eliminate its associated whining noise. It simultaneously functions also as a housing for the stator, thus reducing the stator manufacturing cost and defraying some of the added cost of the more expensive magnet and position sensor required for this concept.
(d) A composite reinforced plastic rotor core and shaft, which is another cost saver because it can be molded to shape instead of machined. In addition it will help with lowering the rotor inertia due to its lower density compared with steel, thus compensating for the increased inertia due to a needed larger magnet. While using a plastic rotor core tends to reduce its torsional stiffness, it is found to yield acceptable angular strain.
(e) A gear reduction box with a high gear ratio to reduce the motor size and cost.

BRIEF DESCRIPTION OF THE DRAWINGS

FIGS. 14A and B illustrate the current waveform and frequency at 1.35 Nm and 1560 rpm.

DETAILED DESCRIPTION OF THE INVENTION

Basic Theory of Electric Power Steering (EPS) Systems

Figure 1:
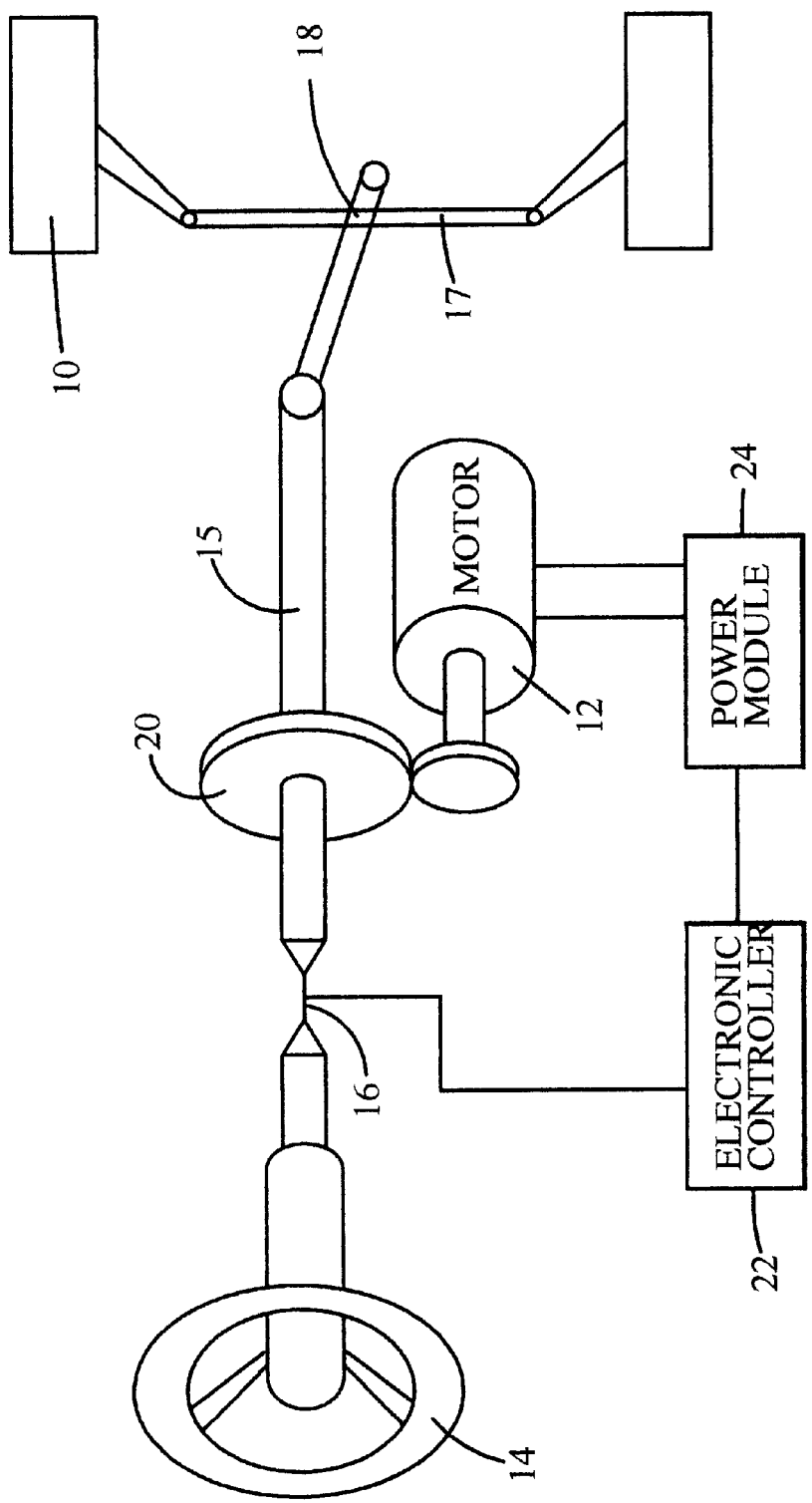
FIG. 1 illustrates a schematic diagram of an electric power steering system.

In a typical EPS system 10, shown schematically in FIG. 1, (FIG. 1 shows a column-mounted EPS system) the steering assist torque is provided by an electronically controlled motor 12 in the amount demanded by the driver's use of the steering wheel 14. The driver's need is sensed and communicated to the motor controller by an in-line torque sensor 16. The assist torque is transmitted to the wheels via the conventional rack-pinion assembly 18, usually by applying the torque to the steering column 15, though it is also known to apply torque to the rack 17 directly. To help with motor packageability, reduction gears 20 are typically placed at the motor shaft. A mechanical link is maintained between the steering wheel and the wheels for safe manual operation in case of failure of the EPS system. An Electronic Controller 22 and Power Module 24 complete the EPS system.

The choice of motor type is a crucial one, because it determines the characteristics of the drive and the requirements on the power switching devices, controls, and consequently cost. Leading contenders are the Permanent Magnet (PM) brushless motor, the Permanent Magnet (PM) commutator-type, the Induction Motor (IM) and the Switched Reluctance (SR) motor, each of the four options has its own inherent advantages and limitations. The PM brushless motor is preferred, chosen on the strength of years of experimenting with commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also of future high performance EPS systems of medium and large vehicles.

Motors that may be used for EPS systems are disclosed in U.S. Pat. No. 5,701,066, assigned to Matsushita (Induction motor); U.S. Pat. No. 5,740,880, assigned to Ford (Induction motor); U.S. Pat. No. 4,940,102, assigned to Mitsubishi (dc commutator motor); U.S. Pat. No. 5,238,076, assigned to Renault (dc commutator motor); U.S. Pat. No. 5,889,378, assigned to Denso (dc commutator motor); U.S. Pat. No. 4,868,477, assigned to Superior Electric (switched reluctance motor); U.S. Pat. No. 5,475,289, assigned to TRW (switched reluctance motor); U.S. Pat. No. 5,742,139, assigned to Dana (switched reluctance motor); U.S. Pat. No. 4,934,472, assigned to Austin Rover (PM brushless motor); U.S. Pat. No. 5,105,113, assigned to Hitachi (PM brushless motor); U.S. Pat. No. 5,919,241, assigned to General Motors (PM brushless motor); U.S. Pat. No. 5,982,067, assigned to General Motors (PM brushless motor); and Murthy, B. Derouane, B. Liu and T. Sebastian, "Minimization of torque pulsations in a trapezoidal back-emf PM brushless DC motor", 1999 IEEE Industry Applications Conference Annual Meeting, Oct. 3–7, 1999, Phoenix, Ariz.; the disclosures of all of which are incorporated by reference herein in their entirety.

Despite the relatively low levels of torque ripple and noise of EPS systems using conventional motors, they are no match for the smoothness and quietness of traditional hydraulic power steering with its decades-long history of development and refinement. Consumers are reluctant in compromising such features. Therefore, a new torque ripple free (TRF) system is needed that, as the name indicates, eradicates the sources of torque ripple (under ideal conditions) and reduces the noise level considerably. The near term goal is to enhance the performance of EPS systems with the long term objective of increasing acceptability of EPS systems for broader usage.

Several performance and cost issues have stood in the way of broad-based EPS commercialization regardless of the technology used, but with varying degree of difficulty. The prime performance issues are steering feel and audible noise.

Steering Feel: The key to the wider use of EPS is the ability to reproduce the smoothness feel of hydraulic steering systems at affordable prices. Pulsating torque produced by motors would be felt at the steering wheel, if not reduced to very low levels.

Audible Noise: The EPS audible noise is mainly emanating from the motor and gearbox. The gear noise is mechanical and is the result of lash caused by manufacturing tolerances. The motor-caused noise is mainly a result of structural vibration excited by torque pulsation and radial magnetic forces in brushless motors and, additionally, by the commutator/brush assembly in commutator motors.

In order to better appreciate the elements of the new scheme, a more detailed discussion about the torque ripple and noise generation mechanisms with a focus on PM brushless motors is presented in the following sections.

Torque Ripple Causes and Remedies

Torque ripple is the primary cause of imperfect steering feel. There are two sources for torque ripple in conventional PM brushless motors, namely cogging torque and commutation torque.

The cogging torque (also known as detent torque) is caused by the magnetic interaction between the permanent magnets and the slotted structure of the armature. It exists in both brushless and brush-type machines at all speeds and loads, including no-load. The magnetic attraction force exerted on each individual stator tooth, as the magnet leading edge approaches, produces a positive torque, while the force between the tooth and the trailing edge causes a negative torque. The instantaneous value of the cogging torque varies with rotor position and alternates at a frequency that is proportional to the motor speed and the number of slots. The amplitude of the cogging torque is affected by some design parameters, such as slot opening/ slot pitch ratio; magnet strength; and air gap length, while its profile could be altered by varying the pole arc/pole pitch ratio. Careful selection of these parameters can lead to reducing cogging torque, but this approach is limited by practical and performance constraints.

A more common and effective approach is by skewing either the stator teeth or the rotor magnet longitudinally, which provides for a gradual transition as the magnet moves under a stator tooth. Theoretically, a skew amount of one slot pitch should eliminate cogging. However, due to practical factors such as magnetic leakage end effects, skew variation attributable to tolerances, and eccentricity, some undesirable cogging remains.

Figure 2:
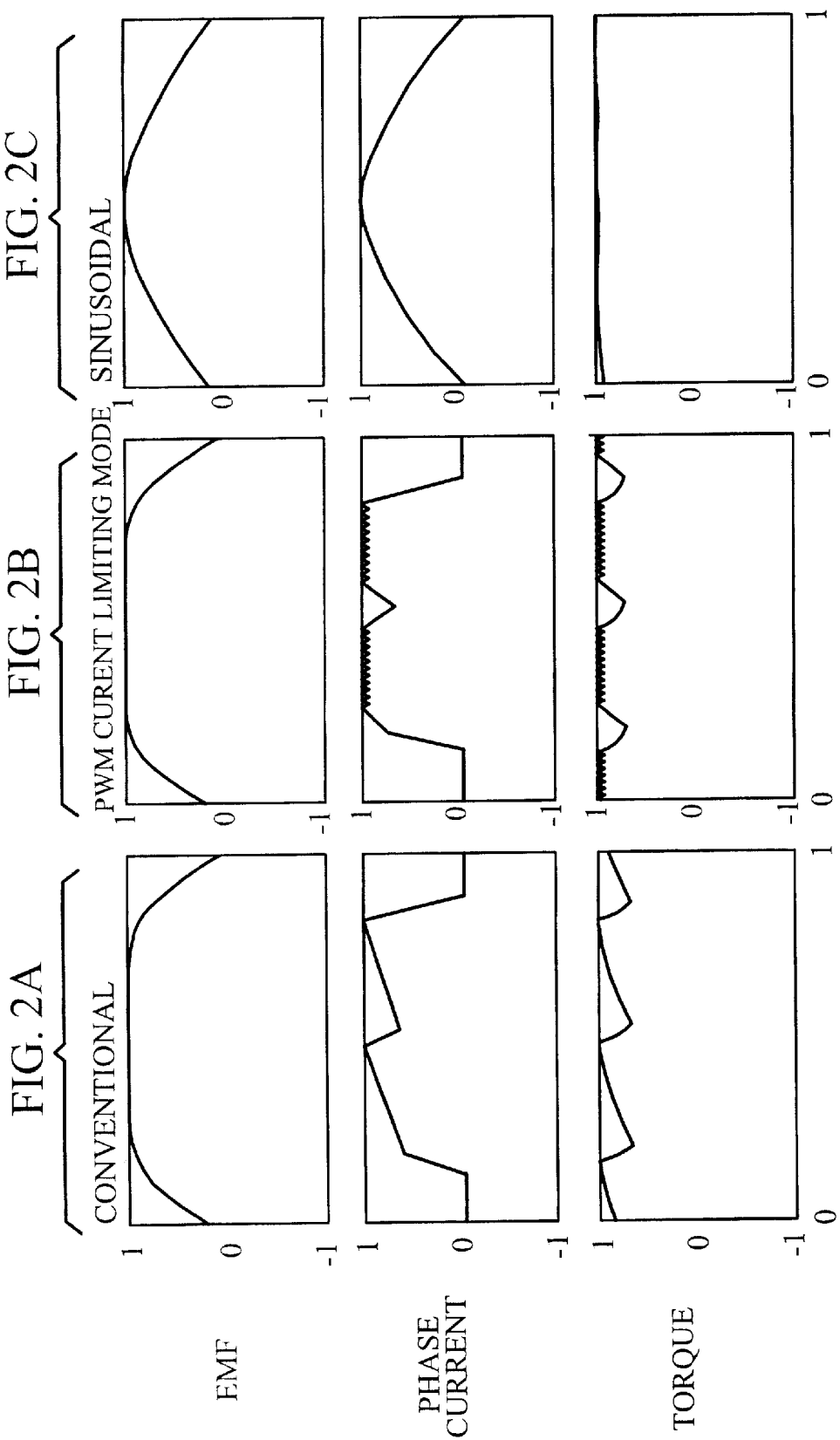
FIGS. 2A–C illustrate a series of current, voltage, and instantaneous torque waveforms in a PM brushless motor.

The commutation torque ripple results from the interaction of the harmonic contents of the stator currents and rotor field, as the instantaneous torque is proportional to the product of the stator current and induced voltage. Typical current and voltage waveforms in a conventional PM brushless motor are shown in FIG. 2A. The trapezoidal voltage waveform 32 results from a magnetic field distribution in the air gap, which is nearly constant under the magnet poles and changing polarity between poles as in most PM machines. The double-hub shape of the current waveform 34 is caused by current switching (commutation) between the motor three phases in a typical six step inverter. Operating in a current limiting mode and using pulse width modulation (PWM) techniques may result in a more square-shaped current, 40 based on the desired duty cycle, as illustrated in FIG. 2B. In either case, 36 and 46 the resulting torque ripple alternates at six times the fundamental frequency of the motor current. Using a higher number of phases or switching steps (e.g. 12 instead of 6) can result in reduced torque ripple content, but requires more switching devices or position sensing elements and increases the cost. There are other less costly torque ripple reduction techniques for PM brushless motors, such as current shaping and phasing. However these techniques are highly dependent on the individual machine parameters, which can vary widely in a high volume production environment due to manufacturing variations and tolerances.

Using a sinusoidal system, 50 as described below, substantially eliminates commutation ripple. This is because sinusoidal currents flowing in three phase windings, especially when they interact with induced voltages of a sinusoidal waveform, produce a constant and smooth torque 56 as illustrated in FIG. 2C and discussed further below.

Audible Noise

The noise generation mechanism in a conventional PM brushless motor is multifaceted: The main contributor to the motor noise is the structural vibration excited by torque pulsation. Causes and remedies of torque pulsation have been discussed above. The TRF concept disclosed below substantially eliminates the torque ripple and thus the origin for this noise contributor.

Noise is also generated by the structural vibration excited by the radial magnetic forces. These are forces exerted by the magnets on the individual stator teeth in a conventional motor, causing the stator structure to cyclically flex and vibrate as the magnets rotate within the stator bore. A toothless configuration as embodied in the TRF concept will not experience such forces and the associated noise.

The high frequency components of the stator non-sinusoidal currents and those introduced by the PWM current or voltage control of EPS motors produce magnetic fields and forces that cause the laminated structure of conventional brushless motors to vibrate at these frequencies producing an audible noise known as magnetic whine. The absence of laminations in the TRF concept will eradicate this noise source.

Another source of audible noise is windage. Substantial air movement through the motor air gap can cause an audible whistling. This air flow is the result of nonuniform gaps between stator teeth and/or magnet arcuates with interpolar air passages. A smooth cylindrical structure as proposed in the TRF concept will reduce such windage noise.

The motor bearings can also contribute to audible noise. This contribution is insignificant for a motor that produces smooth torque and minimal torque pulsation.

It is preferred that all of the following features be used in the electric motor of the invention, though it should be understood that some may be used independently of the others in a manner still useful in reducing torque ripple and noise: (1) Sinusoidal drive; (2) Slotless airgap windings; (3) Higher resolution position sensors; and (4) Powder iron composite parts. How to combine all of these features economically is another feature of the invention, but first it will be useful to describe exemplary available technology for slotless airgap windings and powder iron manufacture that may be used in the invention. By "sinusoidal drive" is meant the combination of a sinusoidal inverter with sinusoidally magnetized permanent magnets, or, more to the point, with magnetic fields created by permanent magnets and distributed sinusoidally in the airgap, as will be described in greater detail below. A sinusoidal drive eliminates commutation torque, though cogging torque remains unaffected. Nevertheless, a sinusoidal drive may eliminate as much as 60% of the total torque ripple.

Sinusoidal Drive

An important element of the present invention is the use of sinusoidal currents to eliminate commutation torque ripple in power steering systems. In itself, the use of sinusoidal currents in permanent magnet (PM) machines is known. Such machines are called "synchronous permanent magnet machines" to distinguish them from "brushless dc machines" which typically use trapezoidal or square current waveforms.

The present application teaches cost-effective ways to use a PM machine driven by sinusoidal currents in order to eliminate torque ripple in a power steering system. Heretofore, PM synchronous machines have been generally considered to be high performance, but high cost, drives, thus inapplicable to automotive applications such as power steering systems. The present invention retains the desired high performance, particularly low torque ripple, but at a moderate price. For instance, an important cost item is the position encoder. These drives require a position encoder because the production of sinusoidal currents requires the knowledge of the actual position of the rotor at all times. Usually, this is achieved with absolute position encoders, resolvers, etc., which are typically expensive because they typically require multiple sensing channels (to obtain a grey code pattern, for instance), or more elaborate electronics in resolver-type encoders.

In this invention, it is shown that, while absolute position knowledge is needed for sinusoidal drives, absolute position sensors are not. The same result can be obtained with an incremental sensor complemented by an index pulse. The advantage is that incremental sensors are much simpler and much less expensive. Using simple logic, the index pulse transforms the incremental pulse information into an absolute position, except, notably, at power-up. During power-up, and as explained later, the proposed system relies on an approximate absolute sensing scheme, based on a conventional "commutation" sensor. The present invention thus does not need memory back-up when the drive is shut down.

Slotless Airgap Windings

An example of slotless airgap windings suitable for use in the invention is disclosed in Schultz, et al., U.S. Pat. No. 4,868,970, for a METHOD OF MAKING AN ELECTRIC MOTOR, issued Sep. 26, 1989, the disclosures of which are incorporated by reference herein in their entirety.

The Schultz patent discloses the use of high energy magnets. A first inclination of a servo motor designer with a new high energy permanent magnet material would be to simply use it as a replacement for other permanent magnets and to expect improved performance, but this is not necessarily the case. Oddly, a similarly designed motor replacing samarium-cobalt magnets with high energy product NdFeB magnets may result in some instances in a motor with significantly lower peak torque in a range unsatisfactory for high performance servo applications. At room temperature NdFeB magnets, like samarium-cobalt magnets, do not show any significant demagnetization characteristics. At elevated temperatures above 100° C. and particularly at temperatures above 140° C., however, the coercivity of the NdFeB magnet falls off rapidly beyond a "knee" and, hence, demagnetization can occur. Because the demagnetization force applied to the magnet is proportional to armature current, a conventional design using NdFeB magnets will have limited peak current and, therefore, low peak torque despite the higher energy product magnets.

Conventional slotted designs also impose limitations on the air gap flux density because of the saturating characteristics of the iron in the teeth between slots. To increase the flux density would require wider teeth, which in turn would result in narrower slots and fewer copper windings. Because of the tradeoff between iron in the teeth and copper in the slots, such designs usually limit the permanent magnet flux density in the air gap to about 7 kilogauss. The permeance of the magnetic circuit determined by the magnet length compared to the air gap length is typically in the range of 4–6 in prior servo motor designs. Substitution of high-energy product magnets is also likely to result in magnets that are impractical to make or handle during fabrication.

According to the Schultz patent, however, it was found that the benefits of the new high energy product magnets (above 26 MGOe and preferably above 30 MGOe) can be realized by using a slotless design provided certain design parameters are observed. The stator winding is a multi-phase winding contained wholly within the magnetic air gap so that there are no saturation constraints in the magnetic circuit and flux densities above 7 kilogauss in the air gap can be used. The ratio of the magnet length to the gap length is in the range of 0.5 to 2.0. The ratio of the interpolar distance to the radial gap length is greater than 1.3. By staying within these design parameters, motors can be designed using the high energy product magnets without danger of demagnetization and with significantly increased power and torque due to reduced inductance which provides more torque/power at high speeds, and lack of reluctance torque and cogging.

A comparison of samarium-cobalt ($Sm_2CO_{17}$) magnet servo motors with motors of comparable size and weight made according to the Schultz patent invention indicates about a 70% increase in the dynamic continuous torque speed output performance and about an 80% increase in the intermittent performance.

In order to achieve the improved results it is important to properly secure the winding within the surrounding back iron cylindrical shell that provides the flux return path. Because the stator teeth are eliminated the winding must be secured to the stator structure with sufficient adhesion to withstand the maximum motor torque force throughout a range of operating temperatures. The winding must be rigid because movement of the conductors adversely affects the ability to generate torque.

Also, heat must be dissipated from the windings. According to the Schultz patent the winding is encapsulated and bonded to the cylindrical stator shell by a ceramic filled epoxy selected to provide (1) a good mechanical strength (i.e., compressive strength, tensile strength, tensile shear), (2) good thermal conductivity, and (3) a coefficient of thermal expansion equal to or greater than that of other material in the stator structure. A suitable material is Nordbak 7451-0148/7450-0027 epoxy made by Rexnord Chemical Products, Inc. Another suitable material is Stycast 2762 made by Emerson and Cummings, a division of W.R. Grace & Co.

The Schultz patent further includes a method for assembling a motor with the winding in the air gap. The winding is formed using a cylindrical support with a reduced diameter section at one end. In one embodiment a fiberglass sleeve is placed around the cylindrical support in the uniform diameter portion and thereafter preformed coils are placed in position. It is understood that the fiberglass sleeve is not necessary to support the coils and that other embodiments do not use a sleeve.

The Schultz invention is a disc drive data storage system having a motor with an "ironless" stator winding. The spindle motor includes a housing, a stationary member and a rotatable member. A bearing interconnects the rotatable member with the stationary member such that the rotatable member is rotatable about a central axis. A magnet is attached to the rotatable member and forms a portion of a rotor for the spindle motor. The "ironless" stator winding is coaxial with the rotor magnet and provides a rotating magnetic field that drives the rotor magnet. In one embodiment, the spindle motor further includes a hydrodynamic bearing and a magnetic field focusing member or back-iron that is attached to the stator winding. The back-iron concentrates the magnetic flux that is generated by the stator winding. The stator winding is "ironless" in that the back-iron is external to the winding. There is no stator core or other magnetic material within the stator winding. In another embodiment, the spindle motor includes first and second rotor magnets disposed about the stator winding. In yet another embodiment, the hydrodynamic bearing is integrated with the motor such that the bearing has a first bearing surface formed by the first rotor magnet and a second bearing surface formed by the stator winding.

The combination of the hydrodynamic bearing and the "ironless" stator winding reduces the forcing functions that give rise to pure tone vibrations in data storage disc drives. Hydrodynamic spindle motors are much quieter than spindle motors having mechanical bearings. It has been found through experiment, however, that pure tone vibrations become more noticeable in hydrodynamic spindle motors because the background vibration level is lower. The pure tone vibrations are no longer hidden in the background. With the "ironless" stator winding, permeance variations in the stator are significantly reduced, which reduces excitation of the pure tone vibrations. The result is a hydrodynamic spindle motor that is capable of very quiet operation.

Powder Iron Parts

Rutz, et al., U.S. Pat. No. 5,063,011, for DOUBLY-COATED IRON PARTICLES, issued Nov. 5, 1991, discloses a method of doubly-coating iron particles to form a composition useful in the preparation of magnetic components having constant magnetic permeability over an extended frequency range. The disclosures of the Rutz patent are incorporated by reference herein in their entirety. The method comprises treating the iron particles with phosphoric acid to form a layer of hydrated iron phosphate at the surfaces of the iron particles, heating the iron particles in an inert atmosphere at a temperature and for a time sufficient to convert the hydrated layer to an iron phosphate layer, and coating the particles with a thermoplastic material to provide a substantially uniform, circumferential coating of such material surrounding the iron phosphate layer.

Mixtures of doubly-coated iron particles for molding high frequency magnetic components are also disclosed in the Rutz patent. The mixtures comprise iron core particles having a weight average particle size of approximately 20–200 microns, wherein the particles have a layer of iron phosphate at their surfaces and a substantially uniform circumferential coating of a thermoplastic material surrounding the iron phosphate layer. In preferred embodiments, the thermoplastic material constitutes about 0.2% to about 15.0% by weight of the coated particles.

Versic, Ronald J., U.S. Pat. No. 5,069,972, for a MOLDABLE MICROCAPSULE THAT CONTAINS A HIGH PERCENTAGE OF SOLID CORE MATERIAL, AND METHOD OF MANUFACTURE THEREOF, issued Dec. 3, 1991, the disclosures of which are incorporated by reference herein in their entirety. Disclosed in the Versic patent is a microcapsule that has a high loading factor of solid core material and can be molded with like microcapsules into a solid body at least 75% of which comprises the solid core material. Also disclosed is a reservoir microcapsule that has a thin, yet strong, protective inner layer of parylene as a primer coating well suited to join to itself a layer of thermoplastic material that molds well with the corresponding layer of thermoplastic material of like microcapsules.

The Versic patent teaches a microcapsule that has multiple hydrophobic layers of coatings around a solid core particle, an inner one of which coatings is conformal to the surface of the core particle, is pinhole-free, is built up by molecular deposition, and can be built up to any desired thickness.

The Versic patent also teaches a microcapsule that has a solid core of magnetic material coated by a layer formed by molecular deposition of free radicals of a monomer that polymerize to form a conformal, pinhole-free layer on the surface of the solid core particle, the radicals being non-reactive with the surface.

The Versic patent also teaches a microcapsule having multiple, hydrophobic coating layers encapsulating a solid inner particle, the inner layer being a pinhole-free, electrically insulating layer conformal to the surface of the particle and having a higher melting temperature than a layer external to it.

In the Versic patent solid particles, which may or may not have ferromagnetic properties and which have a diameter in the range from about a micron to as much as about 500 microns, are encapsulated by a pinhole-free layer of a poly-para-xylylene, known by the generic name of parylene. This layer is formed over the entire surface of each solid particle by molecular deposition of free radicals of parylene monomer that polymerize in place on the surfaces as the particles are tumbled in the presence of a cloud of the monomer. The parylene layer can be deposited using the techniques and apparatuses shown and described in U.S. Pat. Nos. 4,508,760 and 4,758,288, the disclosures of which are incorporated by reference herein in their entirety. The initial molecular layer of the polymerized parylene thus produced conforms exactly to the configuration of the surface of each particle as a strong and unbroken electrically insulating barrier to the passage of oxidizing materials or to the electrical current that would be necessary for oxidation, or corrosion, to take place. The pinhole-free parylene is not only an unbroken insulator over the whole core particle but a good primer coat to tie the next encapsulating layer to the parylene-coated core particle.

In accordance with the Versic patent, the next layer can be any thermoplastic or heat-curable resin capable of serving as a binder when the microcapsules are later formed into a shaped structure, e.g., ABS, epoxy, nylon, polyethylene, polypropylene, polysulfone, polyethersulfone, polyetheretherketone, and phenolic resin and others. Polysulfone and polyethersulfone have been found to be particularly satisfactory. Preferably, the binder material should also serve as a lubricant in the process of forming a shaped structure. It is important that the temperature at which the binder material can be shaped into a desired structure be lower than the melting temperature of the parylene used so that the effectiveness of the latter as a barrier layer will not be adversely affected by any heat required in the shaping process.

Torque-Ripple-Free (TRF) Motor

Figure 3:
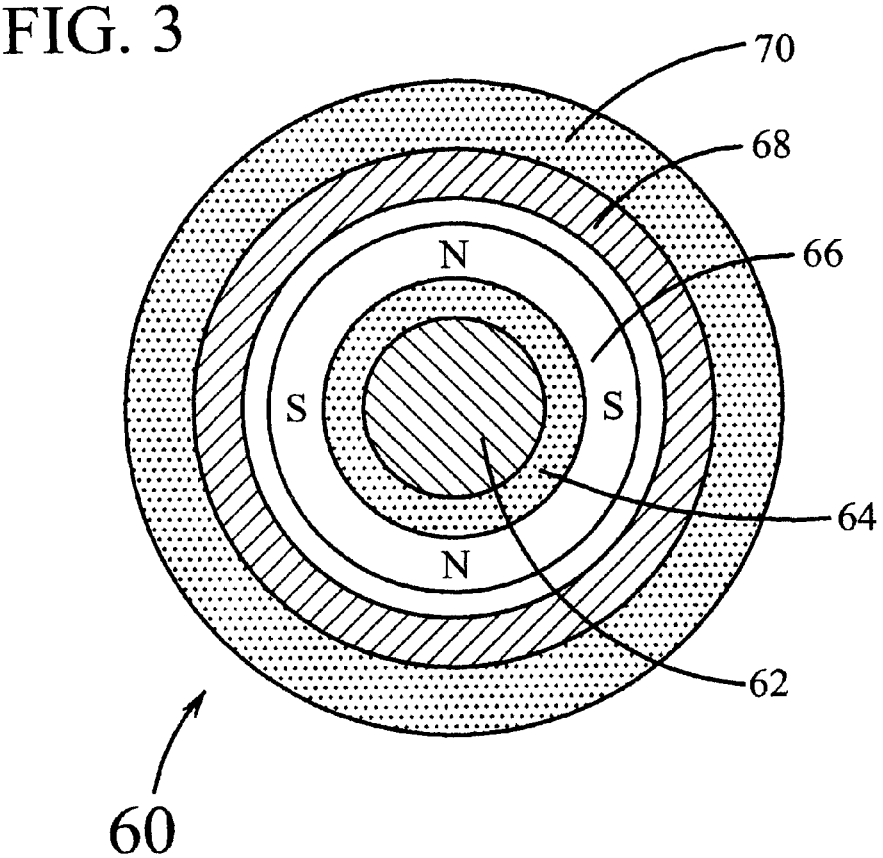
FIG. 3 illustrates a schematic of an embodiment of a TRF motor cross section.

Referring to FIG. 3, there is illustrated an embodiment of a TRF motor of the invention. There is depicted a novel stator with (a) a slotless air gap winding 68 and (b) a composite iron yoke 70, preferably made from powdered iron, that also acts as a housing. A novel rotor is disclosed having a (c) high energy magnet 66 that is sinusoidally magnetized, (d) a molded composite plastic shaft 62, and (e) a new higher resolution position sensor with magnetoresistive sensing elements and steel wheels. The motor will preferably be driven with a sinusoidal inverter. The combination of sinusoidal inverter, sinusoidally magnetized magnets, and position sensor is what is referred to in this specification as the "sinusoidal drive."

The coils of the slotless winding are typically prewound separately on mandrels using high speed winders, arranged in the desired 3-phase configuration, then placed, pressed and glued onto the inside surface of a cylindrical stator yoke or flux carrier. A suggested winding for the TRF motor is built by ELINCO, Inc., which holds Hendricks, H. F., U.S. Pat. No. 4,556,811, for COIL UNIT AND COIL FORM FOR ELECTRICAL MACHINES, issued Dec. 3, 1985, on the process for making such windings, the disclosures of which are incorporated by reference herein in their entirety.

It should be emphasized, however, that the absence of iron teeth as part of the magnetic circuit is not generally desirable because it weakens the magnetic circuit. The consequences are thicker and more expensive magnets, which also increase the rotor inertia. More turns of the stator windings are also required, which results in higher resistance losses. Therefore, this choice is only taken if the benefits, namely cog elimination and sinusoidal field in this case, outweigh the penalties. The results of these trade-offs can lead to one of the alternate configurations described below.

Instead of using a laminated stator yoke around the winding as a flux carrier and then placing the armature assembly inside an aluminum housing, the winding in the exemplary embodiment is housed directly into a one-piece composite iron cylinder, 70. A microencapsulated powder iron material features a low electrical conductivity and reasonable magnetic and mechanical properties. The low conductivity eliminates the need for laminations. The magnetic properties are adequate to carry the magnetic flux circulating between the poles, and the mechanical strength is improved by postbaking to withstand the high-pressure forces exerted during assembly of the winding into the housing. As mentioned earlier, this simple stator construction presents a cost advantage that defrays some of the added cost in the magnet and sensor.

The rotor will most preferably use high energy product (e.g., Nd—Fe—B) ring magnets. The ring magnets are preferably assembled onto the rotor in an unmagnetized state for ease of assembly and then magnetized in place. Using ring magnets, instead of several magnet arcuates that need to be properly spaced and retained, may lower cost for brushless motors in high volume applications. One of the challenges in using high energy ring magnets is the difference in the thermal expansion coefficient of the magnet and the steel core usually attached to it, which result in excessive hoop stresses in magnets leading to their failure under temperature cycling conditions. To overcome this problem, a proprietary process for attaching the magnet to its core has been developed and successfully applied to the TRF motor and many other prototype motors.

Figure 4:
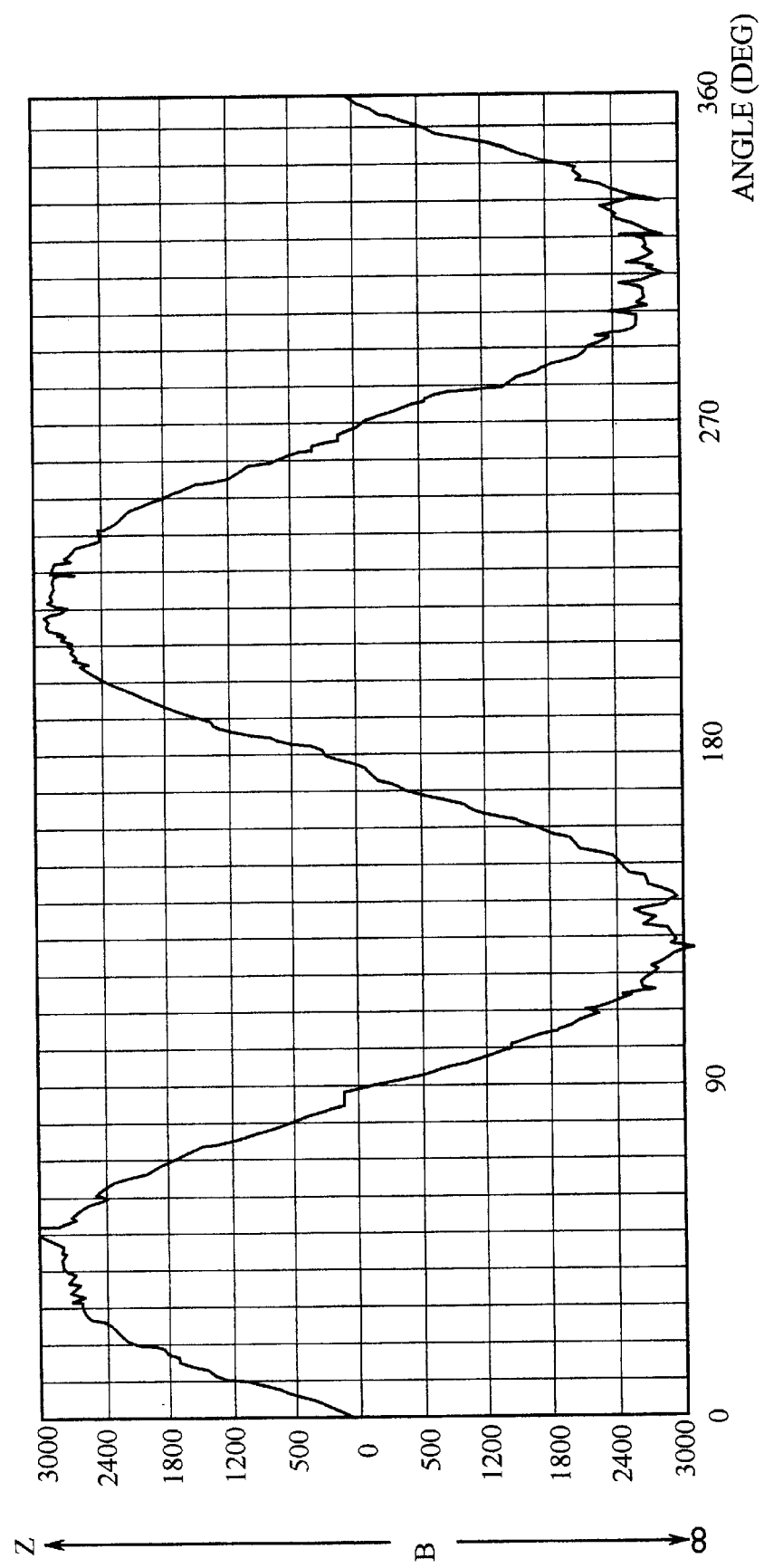
FIG. 4 illustrates the measured magnetic flux density at the surface of a sinusoidally magnetized magnet.

The magnets are magnetized sinusoidally, as shown in FIG. 4 for the field measured over the magnet surface. The deviation from an exact sinusoidal is not crucial in a machine with an air gap winding because the harmonic content is filtered out as the field travels through the large magnetic gap (winding) region. Magnetizing a magnet sinusoidally does not constitute any additional cost compared to conventional trapezoidal magnetization because it is only a matter of using the appropriate magnetizer geometry. The penalty, however, is that the amount of useful flux provided by the magnet is estimated to be about 18% less than in an equivalent trapezoidally magnetized magnet. In other words, to realize a given amount of flux with a sinusoidally magnetized magnet, one would need 18% longer magnet (more cost) than with the trapezoidal case.

Sinusoidally magnetized ring magnets mounted on the surface of the rotor constitute the preferred embodiment. However, the key to this invention is a permanent magnet assembly on the rotor that produces an essentially sinusoidal magnetic field waveform in the airgap. Other permanent magnet assemblies, other than ring magnets, are thus possible. They include, but are not limited to, surface mounted, sinusoidally magnetized magnet arcuates; so-called "Halbach" magnet arrays; and, various configurations of buried permanent magnet structures.

Also, the use of sinusoidal currents in a machine with trapezoidal airgap magnetic field waveforms is possible. It may be an attractive trade-off in some applications. It would lead to reduced torque ripple and noise compared to conventional systems, yet, at the same time, this approach would allow the use of conventional brushless dc motor rotors, a possible cost saving.

The ring magnets and their flux-carrying core are placed over a shaft preferably made of composite plastic. For high-volume manufacturing, composite thermoplastic materials such as "ULTRAMID" made by BASF and the "ULTEM 2300" by GE, can be cost effective and easily molded to shape while integrating other structural components such as the worm and flux carrier during the molding process. The shaft will also carry the toothed wheels of the position sensor, whose sensing elements are housed on the stationary end bells. The sensor is described in more detail below.

In order to generate motor currents with a sinusoidal shape, the inverter switching devices (MOSFETs, for instance) must be turned on and off at specific rotor angular positions. Therefore, the position of the rotor must be known at all times and an encoder is needed. This requirement is one of the factors adding to the cost of sinusoidal drives, hence traditionally limiting their application to high-performance applications. EPS is indeed a high-performance drive, yet it must meet stringent cost limits if it is to be practical for general automotive use. Therefore, a new type of encoder is used that combines high resolution and low cost.

The two most popular ways to sense angular position are based on optical detection and magnetic field variation. Optical encoders are temperature limited and susceptible to dirt. Semiconductor-based magnetic sensors such as Hall effect sensors or magnetoresistors (MRs), on the other hand, can work at higher temperature, and are already used in automotive applications.

Figure 5:
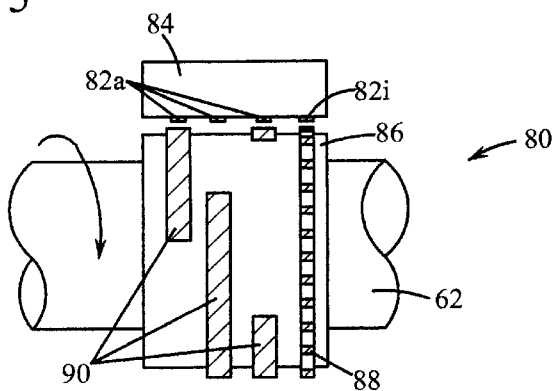
FIG. 5 illustrates a magnetoresistive position encoder configuration.

Referring to FIG. 5, there is shown a preferred angular position sensor 80 having a set of magnetoresistors 82 (MR) mounted on a stationary permanent magnet 84. The magnet faces a steel wheel 86 with several tracks, 88 and 90, each of which has teeth and slots on its periphery. The teeth and slots modulate the magnet's field and these variations in magnetic field are sensed by the MR's 82. The various tracks on the wheel allow the sensor to perform several functions at the same time. A high resolution track 88 provides an incremental signal to enable the generation of sinusoidal currents in the motor. As can be seen, the high resolution track 88 is so named because it has many more teeth about its periphery than the low resolution tracks 90, and it's corresponding MR is designated the incremental position sensor 82i. The three other tracks 90 provide absolute signals every 60 electrical degrees and their associated MR's are designated the absolute position sensors 82a. These absolute signals are used for motor commutation, that is, to direct the current to the appropriate phases, which is important at start-up.

An encoder for a TRF device needs to have the highest resolution possible while keeping the sensor simple enough for low cost. The more teeth on the wheel periphery, the higher the resolution. There is, however, a practical limit to increasing the number of teeth. This limit is caused by the fact that it is difficult to locate the magnet much closer than 1.5 mm away from the target wheel in order to allow for the MR thickness and protective layers on both the magnet and the MR surface, and to provide some clearance between the sensor and the target wheel. If the features on the wheel periphery are much smaller than the gap between the magnet and the wheel, the magnetic field modulation is insignificant and the signal generated is too small to be useful. The sensor resolution is therefore proportional to the sensor wheel diameter. In this particular application, a single MR would provide approximately 4 mechanical degrees resolution, which is not sufficient. Therefore, several MRs are used to generate additional signals and increase resolution to a satisfactory level.

The difficulty in designing a sensor with multiple MRs resides in the fact that the MR signals must all be of similar magnitudes. An MR signal is, typically, an oscillating signal with a dc bias. In order to obtain the final square-wave signal output, the dc bias must be eliminated. The resulting signal zero crossings are then used to trigger a flip-flop and generate a square wave. The dc bias, however, is difficult to predict as it varies with air gap, wheel concentricity, temperature, doping of the MR material, etc. The MR signals are, therefore, best compared with one another as this provides automatic, internal compensation for many of these variations. For such a comparison to be possible, the sensor must be designed to ensure maximum uniformity among the various MRs. A configuration with an array of several MRs facing the same track is chosen. An exemplary number is four. With this approach the MR chips are located close to one another, therefore ensuring air gap and magnetic field uniformity. In addition, the various MRs may be designed to come from essentially the same location on the semiconductor wafer from which they originate, thus minimizing MR material variations. The comparison between the various MRs and the elimination of the dc bias is achieved as follows. The MRs located at both ends of the MR array are spaced exactly one half of a tooth pitch apart, so that their signal output is half a period out of phase. Averaging their output, therefore, yields the dc bias. This provides a resolution of 1.25 mechanical degrees (2.5 electrical degrees with 2 pole-pairs). The testing of the overall drive established that this resolution is sufficient for this application.

Figure 6:
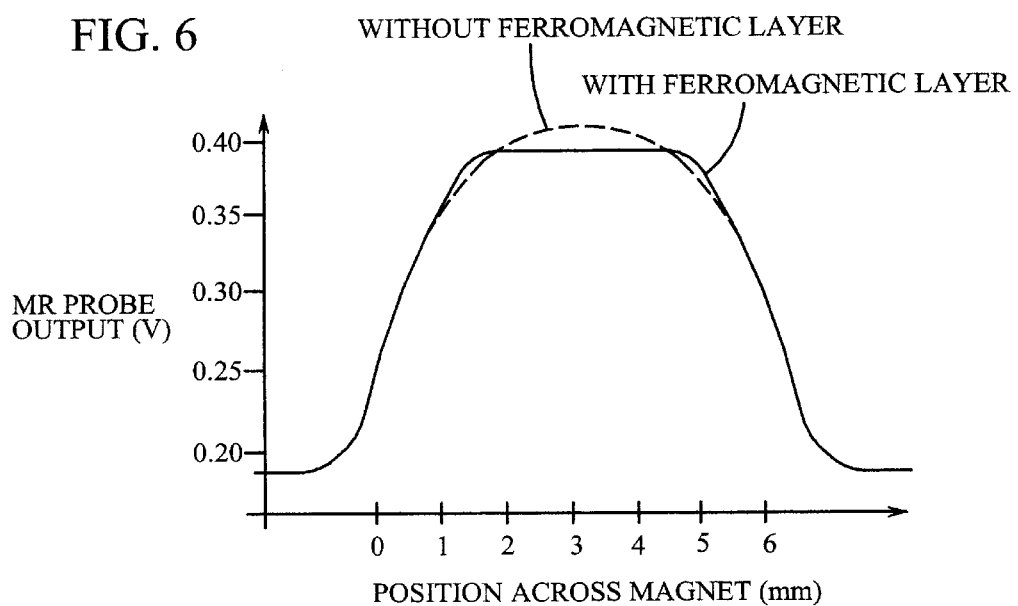
FIG. 6 illustrates a magnetic flux density distribution above a magnet surface, with and without a ferromagnetic layer.
Figure 7:
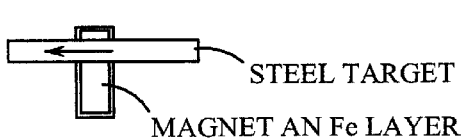
FIG. 7 illustrates a test set-up.

Referring to FIGS. 6 and 7, in order to ensure that the four MRs are biased by as uniform a field as possible, a thin ferromagnetic layer (on the order of 0.13-mm thick) is placed on the magnet surface below the MR array. The effect of a ferromagnetic layer is shown in FIG. 6, where there is plotted the results of a test conducted on a stationary magnet with and without a ferromagnetic layer. The magnetic flux density was measured across the magnet surface in the presence of a steel target emulating the target wheel. FIG. 7 is illustrative of the experimental set up. Without a ferromagnetic layer, the flux density pattern is dome shaped. With a four-MR array where the MRs are 0.5 mm apart, there would be a 1% difference in magnetic bias between adjacent MR's. With a ferromagnetic layer, the magnetic bias is identical, and this 1% variation is eliminated. The ferromagnetic layer may simply be the leadframe used to hold the MRs and connect them to the outside.

In the preferred embodiment, magnetic-based sensors are used, rather than optical sensors, mostly for temperature reasons as well as because optical sensors are susceptible to dirt. Various magnetic sensors are also possible, in a variety of configurations. For instance, Hall sensors can sense a pattern of North and South poles imprinted on a moving permanent magnet assembly. Electrical coils can also be designed to use the variable reluctance principle, or to sense varying self or mutual inductances. Magnetoresistors were chosen in the preferred embodiment because of their higher temperature capability, as well as higher intrinsic signals compared to that of Hall sensors. The particular configuration herein described was chosen because it groups all the active sensing elements close to one another on a single surface, that of a stationary permanent magnet, and this an important cost lowering factor. However, various modifications to the above are possible, including combinations of different technologies. For instance, a Hall sensor-based commutation sensor (readily available commercially) could be used, in conjunction with an MR-based, Hall effect-based, or sealed optical encoder mounted separately on the unit. Finally, various known methods, such as "phase-lock loop", may be used to enhance the resolution of the sensor signal.

Whatever the specific design configuration, the essential elements of the encoder described above, as they pertain to the present invention, are:

First, the use of an incremental encoder complemented with an index pulse to obtain at low cost absolute position during operation, other than during the motor power-up phase. The power-up phase comprises the phase of initial rotation of the steering motor. A power-up phase may be deliberately performed, as a way to initialize the system, when the vehicle in which the system is installed is first started.

Second, the use of an approximate absolute encoder to obtain coarse, but absolute, position information during the motor power-up phase, and generate the desired index pulse at other times.

Specifically, in the preferred embodiment, the approximate absolute encoder comprises a set of three "commutation" sensors, where "commutation sensor" should be understood as they are used in conventional brushless dc motors.

A gear reducer is much preferred in the EPS system to magnify the torque produced by the electric motor to the level required to assist the vehicle steering effort. The higher the gear ratio, the smaller the motor size and cost. This is particularly desirable with the slotless configuration of the TRF concept, which inherently penalizes the permanent magnet weight and cost. Gear drives particularly well suited for this application include, but are not limited to, worm gear drives, harmonic gear drives, hypoid gear drives, and face gear drives.

The torque produced by the TRF-EPS motor can be controlled by either controlling the amplitude and phase of the sinusoidal winding currents (current-mode control) or by controlling the sinusoidal applied voltage (voltage-mode control). Both control approaches have been implemented and evaluated for this invention.

In current-mode control, where the currents are controlled to be in phase with the back-emf voltages, the torque produced is directly proportional to the amplitude of the current reference. Current-mode control requires phase current feedback and proportional-integral (PI) control in order to achieve high accuracy. Current-mode control provides the advantages of maximum torque per ampere, lower torque ripple, fast and precise torque control, inherent overcurrent protection and insensitivity to motor speed and parameter variations. The main drawbacks of current-mode control are the requirements of at least two isolated current sensors and a more complex controller for implementing a fully digital current-mode controller.

In voltage-mode control, the torque produced depends on the motor speed and the machine parameters. For the simple case where the applied voltages are in phase with the back-emf voltages, the steady-state torque is given by:

$$Te=K2*(V-Ke*Z)*R/(R^2+Z^2L^2) \qquad (1)$$

where K2 and Ke are constants; Z is the electrical frequency; R is the winding resistance and L is the machine synchronous inductance per phase. This equation indicates that the torque for a given voltage is a non-linear function of the speed. For a TRF-EPS motor, because of the large magnetic air gap, the inductive reactance is smaller than the resistance, which can lead to simplification of the torque equation as:

$$Te=K2*(V-Ke*Z)/R \qquad (2)$$

In order to achieve constant torque, the applied voltage must be controlled as a function of speed and machine parameters R and Ke. The voltage-mode control does not require current feedback and hence is simpler to implement. However, clean speed feedback signal (free of noise) and knowledge of machine parameters are essential in order to achieve accurate torque control. Once the amplitude of the reference voltage V is calculated based on the torque command, the PWM duty cycles are generated as explained later. A simple implementation of the voltage-mode control without the speed term, Equation (2), would cause the torque to drop faster than desired at high speeds to produce a good road feel.

Figure 8:
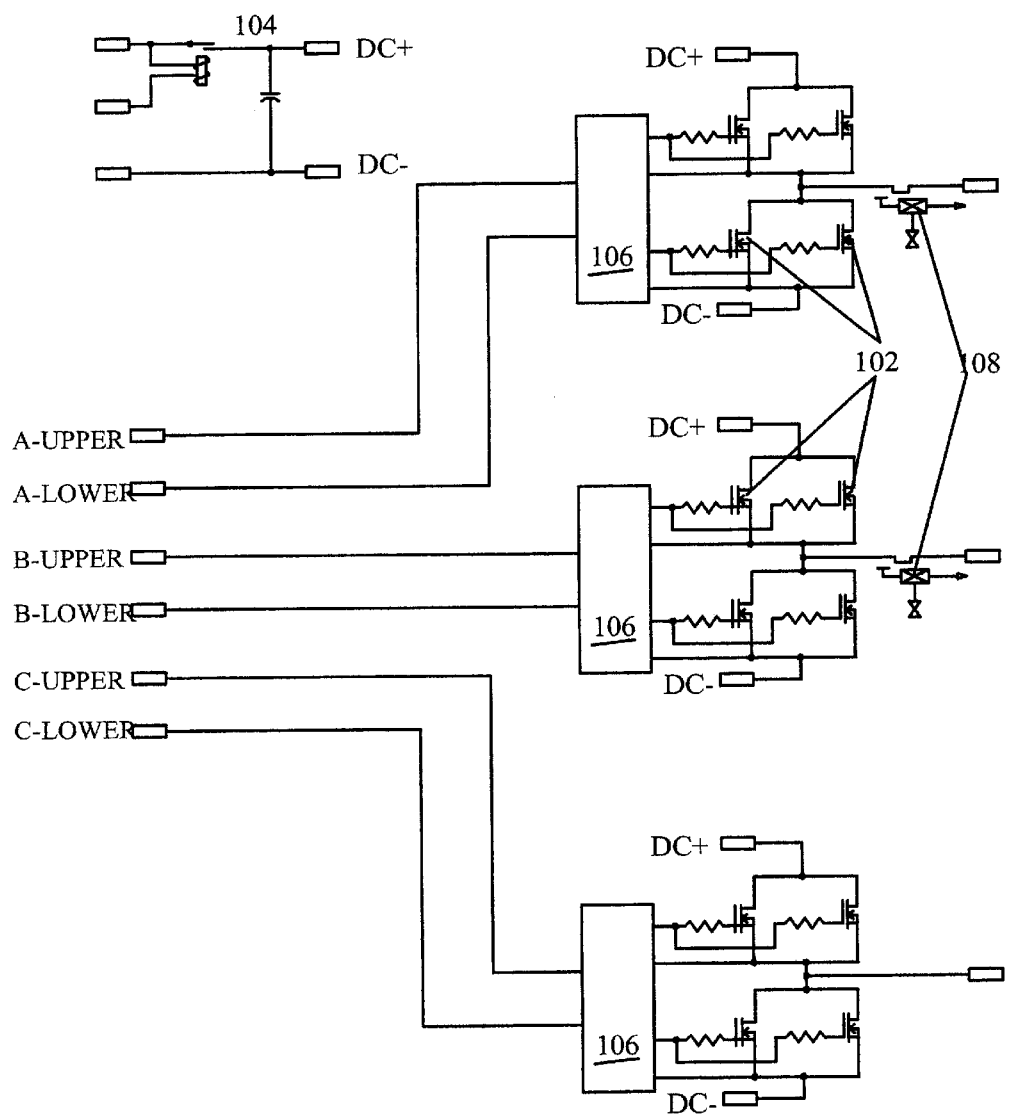
FIG. 8 illustrates a simplified schematic of a TRF-EPS power stage.

Referring to FIG. 8, the EPS Controller Power Stage, is similar to that of conventional trapezoidal-motors with the exception of the phase current sensors. The three-phase full-bridge inverter, 100 uses power MOSFET switches 102 in order to minimize the switching losses at high switching frequencies. Power is connected through a relay 104 in series with the positive side of the battery to the input of the inverter. The relay can be opened in case of a fault, thereby isolating the battery from the inverter. Boot-strap gate drive circuits 106 are used to drive the N-channel MOSFETS 102. This method eliminates the need for costly, isolated power supplies and level shifters for driving the upper-channel MOSFETS. The ON/OFF control signals to the gate drive circuits are generated by the digital controller as explained later. The PWM switching frequency of the MOSFETS is set to approximately 19 kHz, so that audible noise due to inverter switching is minimized. High switching frequency is also necessary in the case of TRF-EPS motor to minimize the current ripple because the motor inductance is very low due to air-gap winding.

In the current control mode, the TRF-EPS 10 system requires two phase current sensors 108 with matched gain and zero offset, in order to control the motor torque precisely. Because the three phase currents add to zero in a Y-connected motor, the third phase current can be obtained from the other two phase currents. While a precision resistor can be used for current measurement, it is not favored in this case because the signal to noise ratio in a PWM inverter is very poor. Instead, the power stage uses two, low cost, open-loop Hall-Effect current sensors at its output, which provide isolated current feedback signals. Each current sensor 108 comprises a linear Hall sensor placed in the gap of a ferrite toroid, with a single turn of the current carrying conductor passing through the center of the toroid. An op-amp is used at the output of the sensor to adjust the gain and offset. Each sensor is calibrated to provide 2.50V at zero current (to be compatible with the input of the A/D converter) and an incremental signal of 20 mV/A. The linear range of the current sensors is −100A to +100A, for which the sensor output ranges from 0.5V to 4.5V. Both sensors can be calibrated for gain and zero offset simultaneously in a production environment with standard laser trimming techniques.

Conventional analog implementation of sinusoidal PWM is realized by comparing a triangular carrier wave at the switching frequency, with a sine wave reference signal, where the crossover points determine the instants of switching the inverter power devices. High carrier frequency (>20 times that of the reference) assures low harmonic distortion even when the carrier signal is not synchronized with the reference waveform. The amplitude of the fundamental output voltage is varied by varying the amplitude of the reference signal relative to that of the carrier. For a three-phase PM motor, three sinusoidal reference signals are needed that are synchronized to the motor back-emf using the rotor absolute position information. However, analog methods suffer from gain and offset drift problems. Further, the sinusoidal current control of the TRF-EPS motor requires a lot of non-linear elements such as multipliers, trigonometric function generators etc. Implementing them in analog hardware is expensive and makes the controller tuning more difficult.

Therefore, it is found that an all-digital controller implementation is a more practical proposition. With the all-digital approach, the PWM signals are generated by digital comparators fed by digitally synthesized carrier and reference signals.

Figure 9:
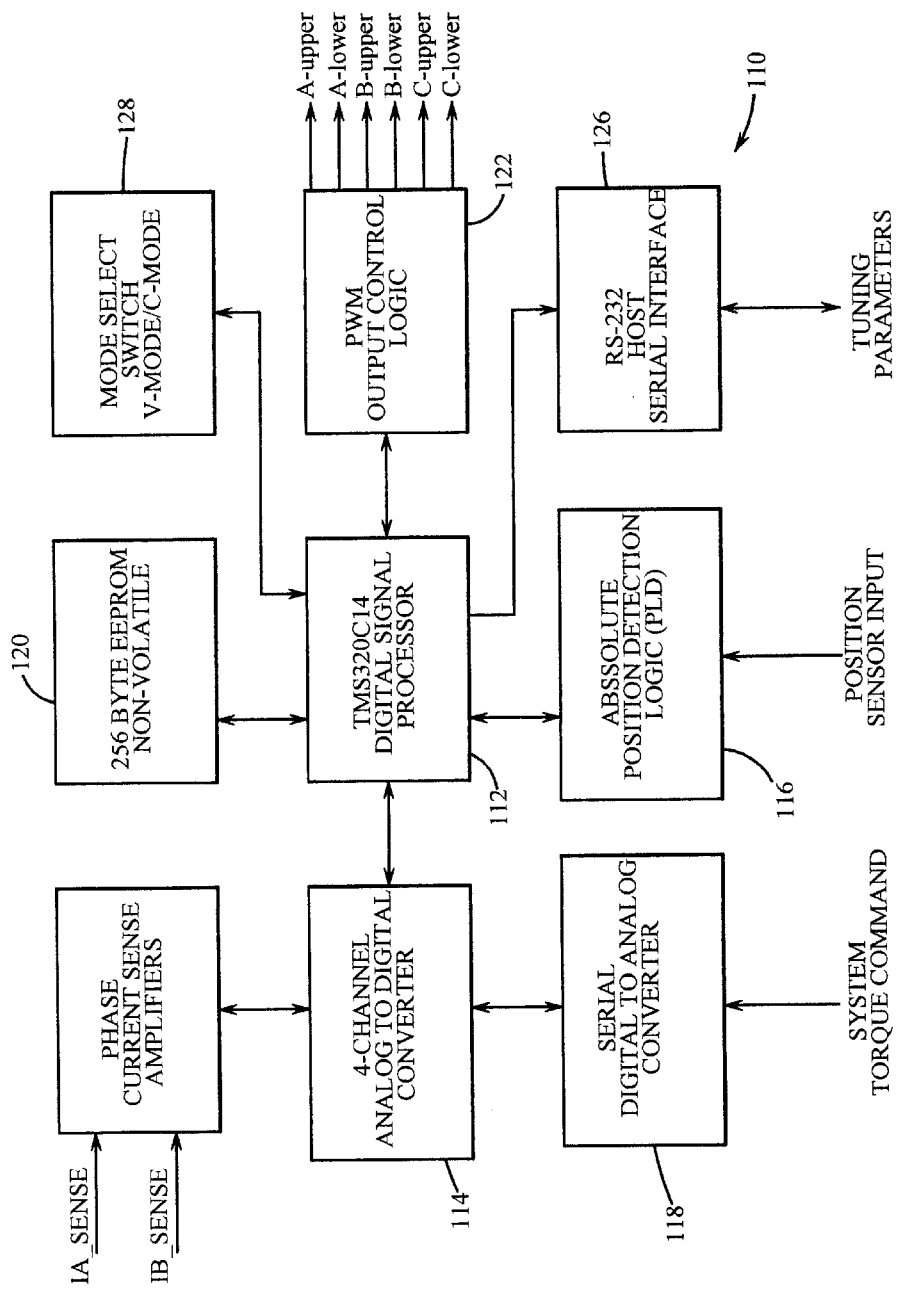
FIG. 9 illustrates a digital signal processor based TRF-EPS controller architecture.

Referring to FIG. 9, the all-digital controller hardware 110 generally comprises a TMS32OC14 DSP chip operating at 25 MHz, 112 a 4-channel, 3 Ns, 10-bit analog to digital converter (ML2375), 114 with 2-channel simultaneous sampling capability, a Programmable Logical Device (PLD) for absolute position detection and address decoding (explained later), 116 two current sense amplifiers and a serial DAC interface to the system controller. The DSP chip contains high speed ALU that can multiply two 16-bit numbers in 160 ns, 4K of EPROM for program storage, 118, 256 bytes of data RAM, 6 channels of digital PWM comparators 122 and two timer counters for speed measurement 124. Other peripherals included in the controller are an RS-232 serial interface to a host computer 126 and a 256-byte EEPROM 120 for storing system parameters such as the index position offset and the current loop integral and proportional gains.

For the experimental hardware built, the operating mode can be selected to be either voltage-mode or current-mode, using an external switch 128. The torque command is received as an analog signal via the serial DAC 118 and is digitized by the A/D converter 114 along with the current feedback signals. The DSP 112 reads the rotor absolute position from the PLD, the torque command and feedback currents from the ADC and using the proper algorithm, generates the 3-phase PWM signals using internal digital comparators. These PWM signals are further processed by the PWM output logic to insert a dead-time between the top and bottom MOSFET control signals before applying them to the gate drive circuits on the power stage. The entire control algorithm execution time is less than 100 Πsec and has proven to be fast enough to achieve pure sinusoidal currents and low torque ripple.

As explained above, the rotor position sensor used in the TRF-EPS system provides an incremental high resolution signal (obtained by combining quadrature signals EA and EB) with 2.5° resolution (electrical), a direction signal (derived from quadrature signals EA and EB, from ways known in the art, and not shown) and three commutation signals (H1, H2, H3) that provide absolute position information with 60° resolution, as illustrated in FIG. 10. Here and in FIG. 10, "degrees" must be understood as "electrical degrees".

It is therefore necessary to derive the absolute position using these signals. This is achieved by deriving an index pulse from the three commutation signals (H1, H2, H3), and combining it with the incremental signal. That is, each time the system generates an index pulse, position is reset, then it is adjusted according to the incremental signal. More specifically, the direction of rotation signal is used to add, or subtract, one step each time that an incremental signal is generated.

The index pulse may be derived as follows. First, a zero reference angle must be chosen. For instance, one may choose the positive zero crossing of the back-emf of phase A, when the motor is rotating in the forward direction, as the zero reference angle. Then, the controller is designed in such a way that one of the transitions in signals (H1, H2, H3) corresponds to that zero reference angle. This can be achieved by first placing the sensor during assembly so that signal H1 (for instance) corresponds to the back-emf of phase A, and also by placing it in such a way that the transitions in signal H1 from level 0 to level 1 (and vice-versa) correspond to the zero crossings of that back-emf.

Which one of these two transitions, either the rising edge or the falling edge, corresponds to the chosen zero reference angle depends on the direction of rotation. If, during clockwise rotation, the rising edge corresponds to the zero reference angle, then the falling edge corresponds to the zero reference angle during counterclockwise rotation. Therefore, the direction-of-rotation signal is used to discriminate which one of the rising or falling edges of H1 is the zero reference angle.

The method adopted for determining the absolute position then uses an 8-bit up/down position counter that counts the high resolution pulses using the direction signal to determine whether to count up or down. The maximum count of this counter is set to 143, corresponding to 357.5°.

At power-up, the counter is initialized with an angle value that is equal to the midpoint of the 60θ sector determined by the three commutation signals. Thus the initial position can have a maximum error of ±30°. This illustrates the use of the three commutation sensors as coarse, but absolute, position sensors during power-up. This will result in a worst-case reduction of the initial torque to 86.6% of the commanded value. The controller can then switch over to sinusoidal current control as soon as a transition in either one of H1, H2 or H3 is sensed, or as soon as a first index pulse is generated.

Figures 10A, 10B:
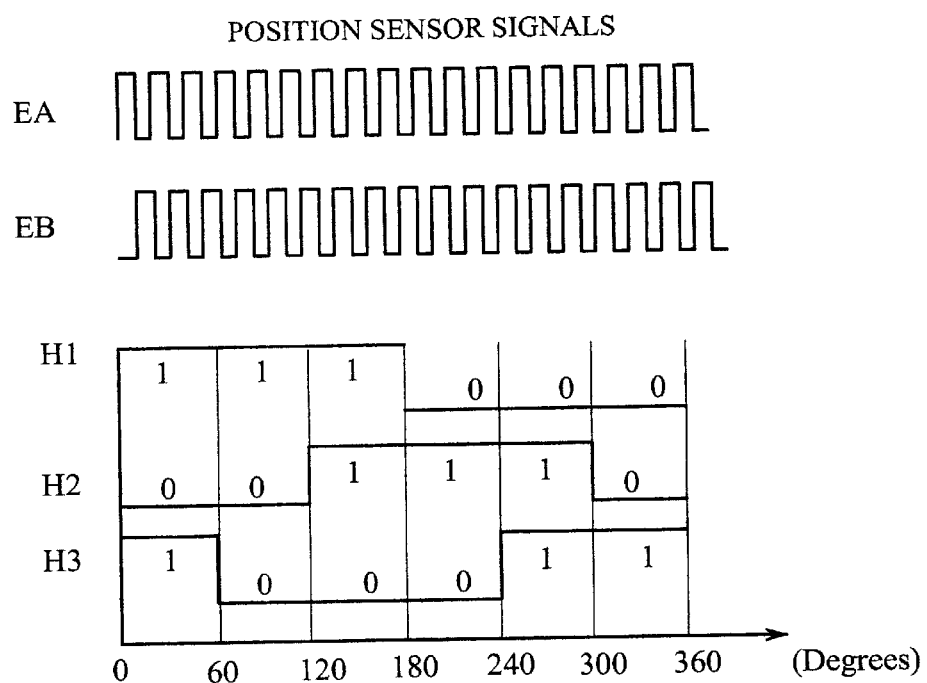
FIGS. 10A and B illustrates a position sensor signal and the corresponding position initialization logic.

Considering the power-up phase more broadly, any coarse absolute position sensor could be used that would define large angular intervals such as the 60° intervals mentioned earlier. The system would then, at power-up, assume that the motor is in the middle of the sensed large angular interval, however wide or narrow it may be. Commutation sensors providing signals H1, H2 and H3 in FIG. 10A are proposed here as the preferred embodiment because they are a technology commonly used with brushless motors. In a sense, this approach enables to start the system as a brushless motor using currents with square waveforms, and switch over to the more desirable sinusoidal control as soon as a transition in either H1, H2 or H3 is sensed, or as soon as a first index pulse is generated.

The position counter initialization logic is shown in FIG. 10, where the rising edge of commutation signal H1 is assumed to be aligned with the positive zero crossing of the back-emf of phase A for increasing angles. As mentioned earlier, once the motor starts rotating, transition of any commutation signal can be used for setting the rotor position counter to the absolute value, from which the counter can keep track of the position at 2.5° increments. Alternatively, only one commutation signal (H1) may be used for correcting the absolute position. This simplifies the logic and minimizes the effects of non-uniform spacing of the commutation signals. Thus the position counter is reset to 0θ on the rising edge of H1 signal for increasing angles and preset to 357.5° on the falling edge of H1 for decreasing angles. This scheme enables tracking of the absolute position within one electrical cycle from the time of starting the system. All the logic for detecting the absolute position is implemented in an Altera EPM5128 Programmable Logic Device (PLD). The position counter initialization and reading of the absolute position is carried out by the DSP. Any offset of the reference edge of H1 from the zero reference point of phase A back-emf is corrected in the controller software.

For conventional sinusoidal modulating functions, the per unit duty cycles of the resulting 3-phase PWM pulses at any given instant are given by:

$$D_a(T)=0.5*[1+V*\sin(T)]$$

$$D_b(T)=0.5*[1+V*\sin(T-2\pi/3)]$$

$$D_c(T)=0.5*[1+V*\sin(T+2\pi/3)] \qquad (3)$$

where $-1<V<1$ is the amplitude of the reference sine wave and T is the rotor position.

The maximum line to line RMS fundamental voltage obtainable with this modulation method is $0.6124\ V_{dc}$, where $V_{dc}$ is the inverter bus voltage. However, by injecting triplen harmonics (3rd, 9th, 15th, etc.) into the modulating functions, the RMS fundamental voltage can be increased while keeping the currents sinusoidal because the Y-connected motor does not allow triplen currents to flow. The TRF-EPS system utilizes space vector modulation where the modulating function sin(T) is replaced by:

$$f(T)=(2/\sqrt{3})V*[\sin(T)+(10/48)\sin(3T)-(1/48)\sin(9T)+\ldots] \qquad (4)$$

This modulation method provides an RMS fundamental line to line voltage of 0.7071 Vdc, which is 15.5% higher than that of a simple sine modulation. The space vector modulation function as well as the 3-phase digital PWM functions are implemented by the DSP chip. The sine function is obtained from a look-up table and is multiplied by the reference voltage in order to generate the PWM duty cycle values. The resolution of the digital PWM signals is 40 ns and the PWM frequency is set to 19 kHz.

Figure 11:
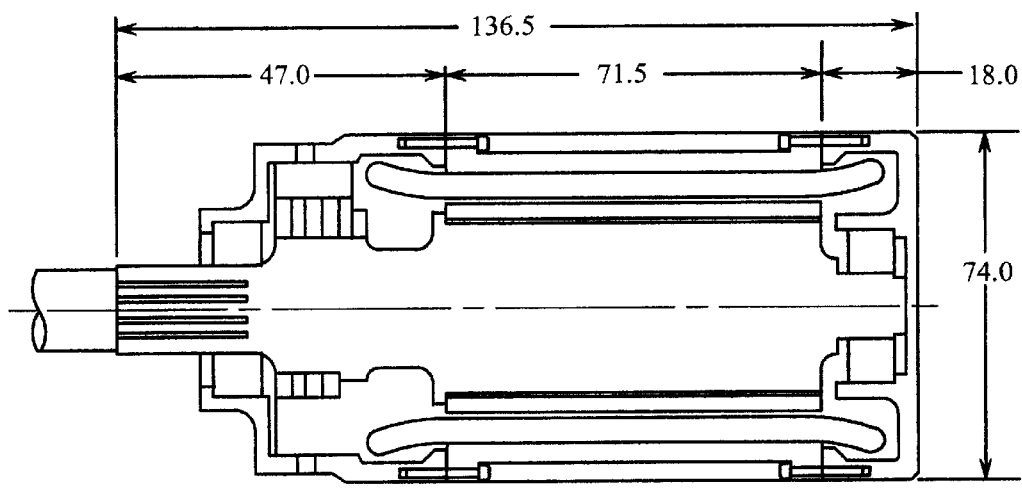
FIG. 11 illustrates a TRF motor cross-section and physical dimensions.

An optimized TRF motor design, shown in cross section in FIG. 11, was constructed and tested. The bench testing comprises a) verification of system performance as measured by the quality of the sinusoidal voltage and current waveform, sensor signal and resolution; and b) evaluating the torque-ripple content in comparison with the base-line motor.

Figure 12:
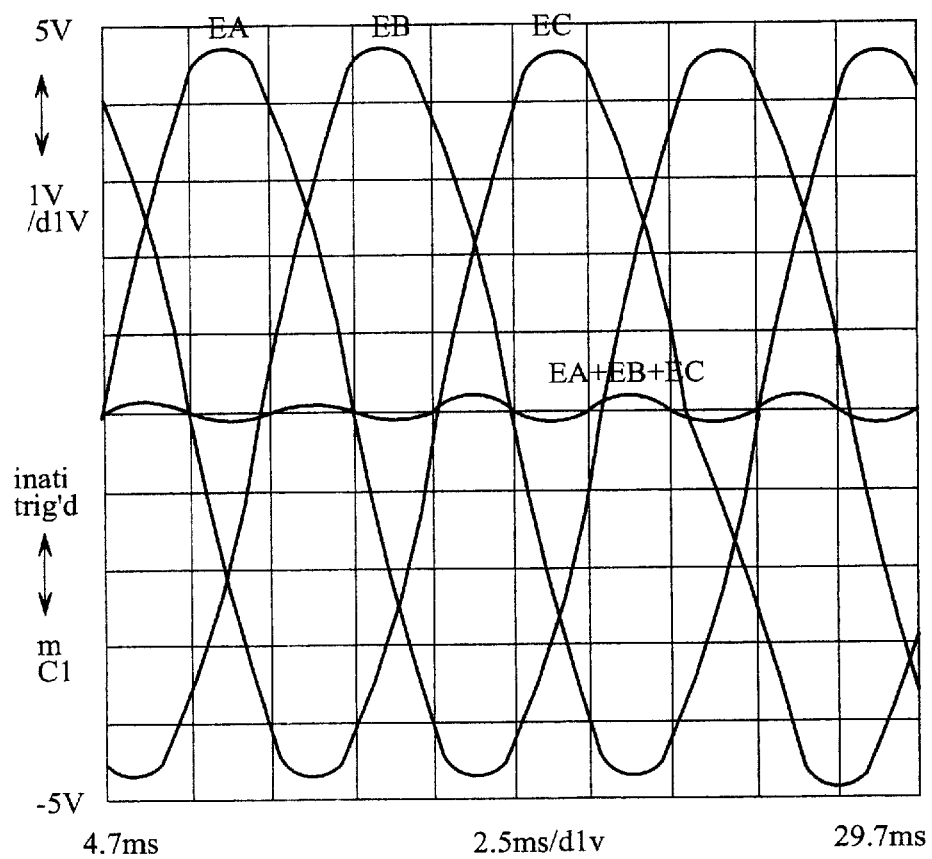
FIG. 12 illustrates no-load induced voltages at 2000 rpm.

To assess the quality of the induced voltage waveform the machine is driven by the dynamometer as a generator and the no-load induced voltage waveforms of the three phases with respect to neutral were recorded at 2000 rpm. The waveforms, illustrated in FIG. 12, indicate excellent sine wave quality. Adding all three phases in FIG. 12, however, reveals a small amount of third harmonic content (<1%), that is not expected to contribute much to torque-ripple. Ideally, for pure sinusoidal waveforms the sum of all three phases should be zero at all times. It should be noted therefore that for the purposes of this invention, the term "sinusoidal" with respect to the currents is to be interpreted to mean "nearly" or "essentially" sinusoidal. Generally, the torque ripple in the motors of this invention will be within the range of 0 to 3%, preferably 0 to 2%, more preferably 0 to 1%, and most preferably less than 1%.

Figure 13B:
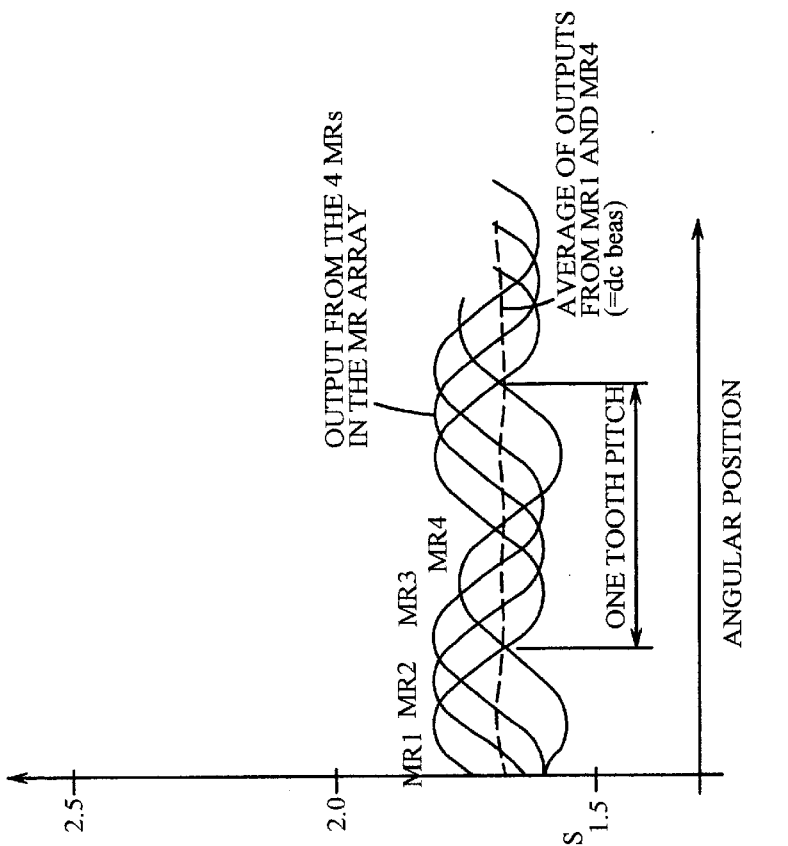
FIGS. 13A and B illustrate MR signals in a high resolution array.
Figure 13A:
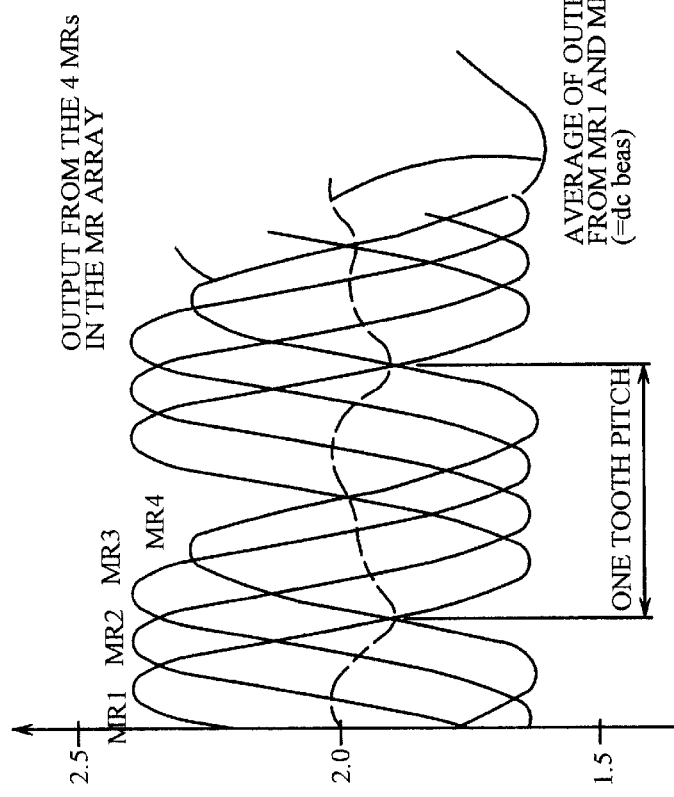

The quality of the current waveform and the reliability of the entire electronic controller are highly dependent on the robustness of the encoder signal. Tests of the MR encoder separately before assembly on the TRF system showed satisfactory operation of both the commutation and high-resolution sensors at air gaps up to 0.6 mm. This represents a safe margin of operation. FIGS. 13A and 13B show the high-resolution track MR outputs at 0.1 and 0.5 mm air gaps, on the same scale. The dotted line represents the dc bias as calculated by averaging the outputs of the MRs located at both ends of the array, and the angular distance between the signals at the intersections with the average is approximately 1.25 mechanical degrees as expected. The oscillations on this signal show whatever minor variations still remained between the MR signals, despite the design efforts to eliminate them. Further increases in encoder resolution, or improvements in sensor robustness, would require stronger signals, which could be done by improvements in sensor packaging aimed at reducing the thickness of the protective layers on the MRs. The distance between the magnet and the sensor outer surface was 1.33 mm in the tested prototype.

FIGS. 14A and 14B show the phase current waveform and its frequency spectrum, respectively, with the machine running at 1560 rpm and delivering a torque of 1.35 N-m to a dynamometer load. Here again, the current waveform shows a very good sine wave quality. The frequency spectrum shows a component at the fundamental frequency of 52 Hz and a very small component at the PWM frequency of 19 kHz. This good sine wave quality was observed over the speed and load range.

Figure 15:
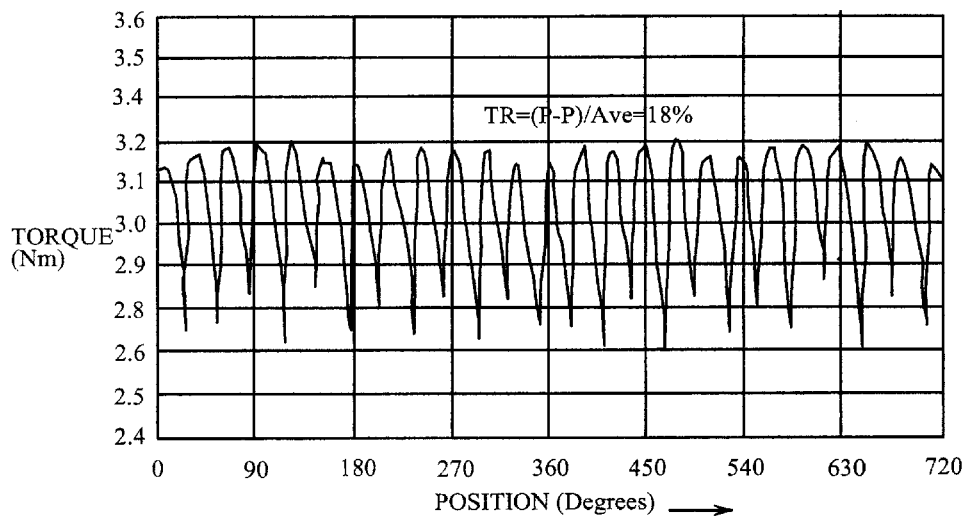
FIG. 15 illustrates the torque ripple of a baseline motor at 10 rpm.
Figure 16:
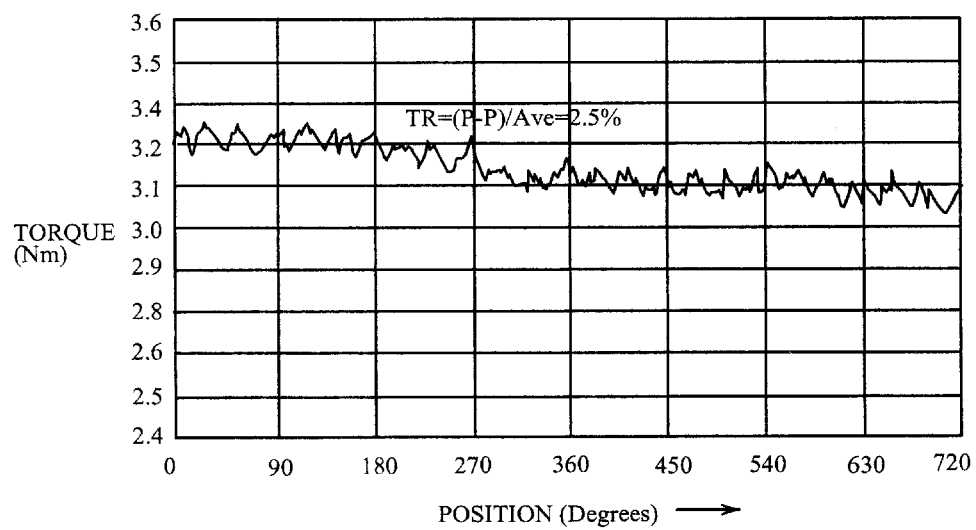
FIG. 16 illustrates the torque ripple of a TRF motor at 10 rpm.

The torque ripple content was evaluated at a test stand equipped with automated data acquisition system. The results were compared with those of a trapezoidal motor used by the assignee to serve as a base line. The torque ripple tests were conducted for a voltage-mode operation (mainstream approach at the time of testing) and at a low motor speed (10 rpm), because at high speed the system inertia (of both tested and dynamometer motors) tends to mask any present torque ripple. This is a known measurement difficulty that has not been overcome. The data were collected over two mechanical revolutions as displayed in FIGS. 15 and 16 for the base line and the TRF motors, respectively. It is clear that the TRF system exhibits a much less torque ripple content, (peak-peak)/average, than the base line system (2.5% versus 18%).

It is important to emphasize that at higher, more realistic operating speeds the torque ripple content in a trapezoidal system is expected to increase due to increased distortion of the current waveform particularly in the voltage-mode control case. In a sinusoidal case the torque ripple content should remain unchanged because the current waveform responsible for the torque profile remains unchanged and controlled to the near sine wave at all speeds.

A number of factors influence the amount of torque ripple produced in a "real world" sinusoidal machine. Among these are machine eccentricities due to manufacturing tolerances, the encoder resolution, mismatches or offsets in the current sensors, and round-off and other processing errors or noise in the controller. Consequently, torque ripple will never be equal to zero in a "real world" system. However, the intrinsic behavior of TRF-EPS system results in negligible cogging and commutation torque ripple and therefore will always have a significantly smoother feel than that of an equivalent brushless system with all other factors being equal.

An experimental small size vehicle was equipped with a TRF-EPS system for further road and noise evaluation. Initial testing were performed in a semi-anechoic chamber. The same test facility was used to evaluate the conventional EPS systems with trapezoidal motors/inverters, for comparison. The test results were compared with those of the base-line system and another conventional system equipped with special provisions (rotor and frame mounted on rubber isolation) to minimize noise and torque ripple effects. The steering feel was found to be very smooth, especially with current-mode control.

Figure 17A:
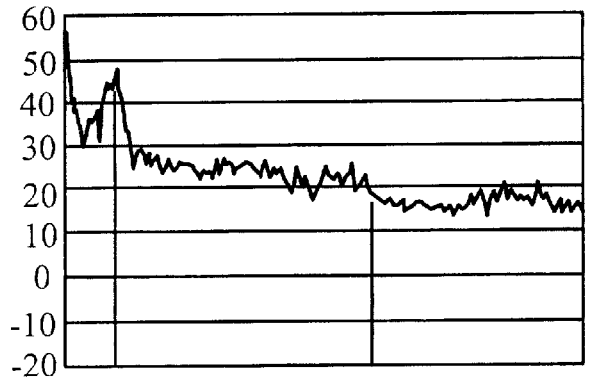
FIGS. 17A–17C illustrate an audible noise spectrum in a baseline motor, a motor with double insulation and a TRF motor with engine idling and steering at 30 rpm.
Figure 17B:
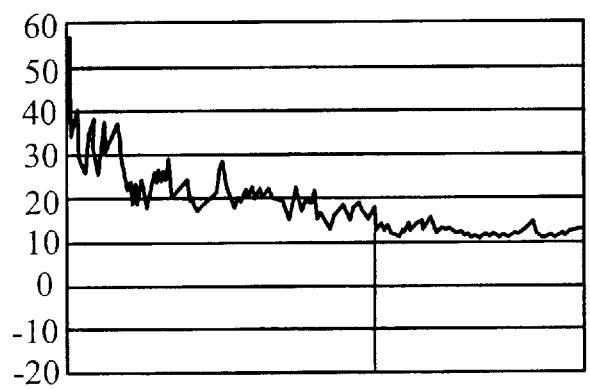
Figure 17C:
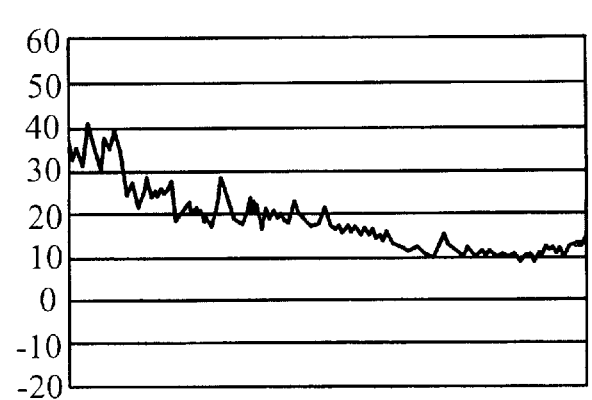

Testing was conducted by an independent test laboratory in their sound quality facility to compare the TRF-EPS system to conventional motors with and without rubber isolation. The tests were conducted with both the engine off and engine idling. A sample of the actual noise spectrum results (for engine idling, steering at 30 rpm) is shown in FIGS. 17A–C.

Compared with the base-line motor (12-slots), the noise level at 600 Hz was reduced dramatically from 47 dBA to 31 dBA with the engine off and from 47 dBA to 36 dBA with the engine idling while steering at 30 rpm. With double rubber isolation on both the rotor and housing, a conventional motor achieved levels of 34 and 24 dBA under the same conditions, respectively. At 100 Hz, the TRF motor noise was down to 28 from 42 dBA with engine off versus 37 dBA with isolation, and down to 31 from 40 dBA with the engine idling versus 36 with isolation. In summary, the TRF concept demonstrated a much quieter operation than conventional motors, to a level perhaps achievable only with rubber isolation of the shaft and housing. In addition to the added cost of such isolation, the housing isolation adds to the motor size and affects packageability.

As mentioned earlier, there are practical limits that lead to a non-zero or parasitic torque-ripple. This parasitic torque ripple results from limitations of the system constructional elements: current sensors offset and gain mismatch; motor eccentricity; unbalanced magnet magnetization; bearing friction; software truncation errors, etc. The level of this parasitic torque level could be minimized by careful consideration of the causes at the design stage.

While the torque-ripple free concept theoretically represents the ultimate in smoothness and quietness, implementing only some of the features of the TRF system can provide partial solutions and permit the use of more conventional machines with their larger available manufacturing base. These should fall, in terms of their ability to reduce torque ripple and noise, on the spectrum in-between the TRF system and the basic system (base line), and should be examined for possible trade-offs between performance on one hand versus expediency and perhaps even lower cost on the other hand. There are three such compromise solutions that are worth examining:

Sinusoidal Inverter and Conventional Motor

A possible embodiment combines a sinusoidal inverter (sinusoidal current) with a conventional machine (trapezoidal voltage). The magnitude of the commutation torque ripple and noise could be less than in the basic system, depending on the width of the flat top of the trapezoidal voltage waveform. The cogging torque is reduced in a traditional fashion by skewing either the magnet or the stator teeth. In this option, a conventional motor with a less expensive high energy magnet can be used.

Sinusoidal Inverter and a Motor having Sinusoidally Magnetized Magnet and a Conventional Stator Another embodiment is the same as the previous embodiment, but with sinusoidally magnetized magnets. For equal performance the machine active length must be increased by about 18% to compensate for the reduction in magnetic flux associated with a sinusoidal waveform as opposed to trapezoidal. However, this option has the potential of approaching the low torque ripple level of the TRF system. It does not benefit from the simplicity of the slotless winding, but also does not necessarily need the expensive high energy magnets as for a slotless construction. The decision between less expensive vs. expensive magnets, in this case, should be based on packaging and economic constraints.

Slotless Winding with Trapezoidal Magnetic Field Waveform

Another possible alternative embodiment comprises a conventional rotor producing a trapezoidal magnetic field waveform in the airgap, along with a slotless stator. Such an arrangement would completely eliminate cogging torque, and significantly reduce the radial forces that are a source of vibration and audible noise. As long as trapezoidal currents and magnetic field waveform are used, commutation torque ripple would still be present.

Rotary machines constitute the most common technology for electric power steering. Rotary machines will be of the radial-field type, as 5 shown in the figures included in this application, or could be of the axial-field type as well. However, inasmuch as linear motors are an option (U.S. Pat. No. 5,924,518), the various aspects of the present invention could be used in a linear motor configuration to reduce "force" ripple.

While preferred embodiments have been shown and described, 10 various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. An electric motor system with reduced torque ripple comprising:
   an electric motor having a stator and a rotor and at least one windings; said electric motor comprising:
   permanent magnetic means effective in generating an essentially sinusoidal magnetic field; and
   a higher-resolution position sensor effective in sensing the angular position of said rotor; and
   a sinusoidal inverter coupled to said electric motor to drive at least one winding current through said at least one windings of said electric motor wherein said sinusoidal inverter is adapted to receive angular position information from said higher-resolution position sensor to control said at least one winding currents to be essentially sinusoidal.

2. The invention of claim 1 wherein said permanent magnetic means further comprises at least one sinusoidally magnetized permanent magnets.

3. The invention of claim 1 wherein said electric motor further comprises slotless airgap windings.

4. The invention of claim 1 wherein said at least one windings of said electric motor are located in slots separated by teeth.

5. The invention of claim 1 wherein said stator is made from a powdered iron composite.

6. The invention of claim 5 wherein said stator is also the motor housing.

7. The invention of claim 1 wherein said rotor further comprises a composite reinforced plastic shaft.

8. The invention of claim 1 wherein said rotor further comprises a composite iron shaft.

9. The invention of claim 1 wherein said electric motor system further comprises a torque command, wherein said control of said at least one winding currents is responsive to said torque command, and wherein said control is a current-mode control.

10. The invention of claim 1 wherein said electric motor system further comprises a torque command, wherein said control of said at least one winding currents is responsive to said torque command, and wherein said control is a voltage-mode control.

11. The invention of claim 1 wherein said higher-resolution position sensor further comprises:
- an incremental position sensor; and
- an absolute position sensor defining a reference angle.

12. The invention of claim 11 wherein said absolute position sensor further defines one or more electronic signal, where said one or more electronic signal each includes a first level and a second level, and said reference angle is based upon a transition from said first level to said second level of one said electronic signal when said motor is rotating clockwise, and is based upon a transition from said second level to said first level of said one electronic signal when said motor is rotating counterclockwise.

13. The invention of claim 12 wherein a power-up phase of said electric motor further includes the steps of:
- determining an angular interval from said one or more electronic signals from said absolute position sensor;
- exciting one or more said winding from said motor according to said determined angular interval; and,
- controlling said winding currents to be essentially sinusoidal after one of said electronic signals from said absolute position sensor has effected a transition from one of said first and second levels to the other of said first and second levels.

14. The invention of claim 11 wherein said at least one motor windings of said electric motor is arranged into one or more phases, and said absolute position sensor further comprises one electronic signal for each said motor phase.

15. The invention of claim 1 wherein said higher-resolution position sensor comprises:
- a magnetoresistor;
- a toothed track; and
- said magnetoresistor(s) and toothed track(s) mounted in said motor such that relative rotational motion between said rotor and said stator results in relative rotational motion between said magnetoresistor(s) and said toothed track(s); and
- wherein said magnetoresistor(s) is disposed sufficiently close to said toothed tracks(s) so as to be effective in detecting said relative motion.

16. The invention of claim 2 wherein said electric motor further comprises slotless air gap windings.

17. The invention of claim 16 wherein said at least one winding of said electric motor are located in slots separated by teeth.

18. The invention of claim 17 wherein said stator is made from a powdered iron composite.

19. The invention of claim 18 wherein said stator is also the motor housing.

20. The invention of claim 19 wherein said rotor further comprises a composite reinforced plastic shaft.

21. The invention of claim 19 wherein said rotor further comprises a composite iron shaft.

22. The invention of claim 21 wherein said electric motor system further comprises a torque command, wherein said control of said at least one winding current is responsive to said torque command, and wherein said control is a current-mode control.

23. The invention of claim 21 wherein said electric motor system further comprises a torque command, wherein said control of said at least one winding current is responsive to said torque command, and wherein said control is a voltage-mode control.

24. The invention of claim 22 wherein said higher-resolution position sensor further comprises:
- an incremental position sensor; and
- an absolute position sensor defining a reference angle.

25. The invention of claim 24 wherein said absolute position sensor further defines one or more electronic signal, where said one or more electronic signal each includes a first level and a second level, and said reference angle is based upon a transition from said first level to said second level of one said electronic signal when said motor is rotating clockwise, and is based upon a transition from said second level to said first level of said one electronic signal when said motor is rotating counterclockwise.

26. The invention of claim 25 wherein a power-up phase of said electric motor further includes the steps of:
- determining an angular interval from said one or more electronic signals from said absolute position sensor;
- exciting one or more said winding from said motor according to said determined angular interval; and,
- controlling said winding currents to be essentially sinusoidal after one of said electronic signals from said absolute position sensor has effected a transition from one of said first and second levels to the other of said first and second levels.

27. The invention of claim 24 wherein said at least one motor windings of said electric motor is arranged into one or more phases, and said absolute position sensor further comprises one electronic signal for each said motor phase.

28. The invention of claim 27 wherein said higher-resolution position sensor comprises:
- a magnetoresistor;
- a toothed track; and
- said magnetoresistor(s) and toothed track(s) mounted in said motor such that relative rotational motion between said rotor and said stator results in relative rotational motion between said magnetoresistor(s) and said toothed track(s); and
- wherein said magnetoresistor(s) is disposed sufficiently close to said toothed tracks(s) so as to be effective in detecting said relative motion.

29. An electric motor system with reduced torque ripple for power assisted steering in a motor vehicle comprising:
- an electric motor having a stator and a rotor and at least one windings; said electric motor comprising:
  - permanent magnetic means effective in generating an essentially sinusoidal magnetic field; and
  - a higher-resolution position sensor effective in sensing the angular position of said rotor; and
  - a sinusoidal inverter coupled to said electric motor to drive at least one current through said at least one windings of said electric motor wherein said sinusoidal inverter is adapted to receive angular position information from said higher-resolution position sensor to control said at least one winding current to be essentially sinusoidal.

30. The invention of claim 29 wherein said permanent magnetic means further comprises at least one sinusoidally magnetized permanent magnets.

31. The invention of claim 29 wherein said electric motor further comprises slotless airgap windings.

32. The invention of claim 29 wherein said at least one windings of said electric motor are located in slots separated by teeth.

33. The invention of claim 29 wherein said stator is made from a powdered iron composite.

34. The invention of claim 33 wherein said stator is also the motor housing.

35. The invention of claim 29 wherein said rotor further comprises a composite reinforced plastic shaft.

36. The invention of claim 29 wherein said rotor further comprises a composite iron shaft.

37. The invention of claim 29 wherein said electric motor system further comprises a torque command, wherein said control of said at least one winding currents is responsive to said torque command, and wherein said control is a current-mode control.

38. The invention of claim 29 wherein said electric motor system further comprises a torque command, wherein said control of said at least one winding currents is responsive to said torque command, and wherein said control is a voltage-mode control.

39. The invention of claim 29 wherein said higher-resolution position sensor further comprises:
an incremental position sensor; and
an absolute position sensor defining a reference angle.

40. The invention of claim 39 wherein said absolute position sensor further defines one or more electronic signal, where said one or more electronic signal each includes a first level and a second level, and said reference angle is based upon a transition from said first level to said second level of one said electronic signal when said motor is rotating clockwise, and is based upon a transition from said second level to said first level of said one electronic signal when said motor is rotating counterclockwise.

41. The invention of claim 40 wherein a power-up phase of said electric motor further includes the steps of:
determining an angular interval from said one or more electronic signals from said absolute position sensor;
exciting one or more said winding from said motor according to said determined angular interval; and,
controlling said winding currents to be essentially sinusoidal after one of said electronic signals from said absolute position sensor has effected a transition from one of said first and second levels to the other of said first and second levels.

42. The invention of claim 39 wherein said at least one motor windings of said electric motor is arranged into one or more phases, and said absolute position sensor further comprises one electronic signal for each said motor phase.

43. The invention of claim 29 wherein said higher-resolution position sensor comprises:
a magnetoresistor;
a toothed track; and
said magnetoresistor(s) and toothed track(s) mounted in said motor such that relative rotational motion between said rotor and said stator results in relative rotational motion between said magnetoresistor(s) and said toothed track(s); and
wherein said magnetoresistor(s) is disposed sufficiently close to said toothed tracks(s) so as to be effective in detecting said relative motion.

44. The invention of claim 29 wherein said electric motor system with reduced torque ripple is mounted on the steering column of said motor vehicle.

45. The invention of claim 30 wherein said electric motor further comprises slotless air gap windings.

46. The invention of claim 45 wherein said at least one winding of said electric motor are located in slots separated by teeth.

47. The invention of claim 46 wherein said stator is made from a powdered iron composite.

48. The invention of claim 47 wherein said stator is also the motor housing.

49. The invention of claim 48 wherein said rotor further comprises a composite reinforced plastic shaft.

50. The invention of claim 48 wherein said rotor further comprises a composite iron shaft.

51. The invention of claim 49 wherein said electric motor system further comprises a torque command, wherein said control of said at least one winding current is responsive to said torque command, and wherein said control is a current-mode control.

52. The invention of claim 49 wherein said electric motor system further comprises a torque command, wherein said control of said at least one winding current is responsive to said torque command, and wherein said control is a voltage-mode control.

53. The invention of claim 51 wherein said higher-resolution position sensor further comprises:
an incremental position sensor; and
an absolute position sensor defining a reference angle.

54. The invention of claim 53 wherein said absolute position sensor further defines one or more electronic signal, where said one or more electronic signal each includes a first level and a second level, and said reference angle is based upon a transition from said first level to said second level of one said electronic signal when said motor is rotating clockwise, and is based upon a transition from said second level to said first level of said one electronic signal when said motor is rotating counterclockwise.

55. The invention of claim 54 wherein a power-up phase of said electric motor further includes the steps of:
determining an angular interval from said one or more electronic signals from said absolute position sensor;
exciting one or more said winding from said motor according to said determined angular interval; and,
controlling said winding currents to be essentially sinusoidal after one of said electronic signals from said absolute position sensor has effected a transition from one of said first and second levels to the other of said first and second levels.

56. The invention of claim 55 wherein said at least one motor windings of said electric motor is arranged into one or more phases, and said absolute position sensor further comprises one electronic signal for each said motor phase.

57. The invention of claim 56 wherein said higher-resolution position sensor comprises:
a magnetoresistor;
a toothed track; and
said magnetoresistor(s) and toothed track(s) mounted in said motor such that relative rotational motion between said rotor and said stator results in relative rotational motion between said magnetoresistor(s) and said toothed track(s); and
wherein said magnetoresistor(s) is disposed sufficiently close to said toothed tracks(s) so as to be effective in detecting said relative motion.

58. The invention of claim 57 wherein said electric motor system with reduced torque ripple is mounted on the steering column of said motor vehicle.

59. A electric power assisted steering system for a motor vehicle including an electric motor system, the steering system comprising:
a steerable wheel coupled to a movable rack-pinion gear assembly;
a reduced torque ripple electric motor having a stator and a rotor and at least one windings coupled to said movable rack and a steering wheel; said electric motor comprising:

permanent magnetic means effective in generating an essentially sinusoidal magnetic field; and a higher-resolution position sensor effective in sensing the angular position of said rotor; and a sinusoidal inverter coupled to said electric motor to drive at least one current through said at least one windings of said electric motor wherein said sinusoidal inverter is adapted to receive angular position information from said higher-resolution position sensor to control said at least one winding current to be essentially sinusoidal;

wherein said motor applies an assist torque to said rack-pinion assembly responsive to a command, said command responsive to torque applied to said steering wheel.

60. The steering system of claim 59 wherein said permanent magnetic means further comprises at least one or more sinusoidally magnetized permanent magnets.

61. The steering system of claim 60 wherein said electric motor further comprises slotless airgap windings.

62. The steering system of claim 59 wherein said at least one windings of said electric motor are located in slots separated by teeth.

63. The steering system of claim 59 wherein said stator is made from a powdered iron composite.

64. The steering system of claim 63 wherein said stator is also the motor housing.

65. The steering system of claim 59 wherein said rotor further comprises a composite reinforced plastic shaft.

66. The steering system of claim 59 wherein said rotor further comprises a composite iron shaft.

67. The steering system of claim 59 wherein said electric motor system further comprises a torque command, wherein said control of said at least one winding currents is responsive to said torque command, and wherein said control is a current-mode control.

68. The steering system of claim 59 wherein said electric motor system further comprises a torque command, wherein said control of said at least one winding currents is responsive to said torque command, and wherein said control is a voltage-mode control.

69. The steering system of claim 59 wherein said higher-resolution position sensor further comprises:

an incremental position sensor; and an absolute position sensor defining a reference angle.

70. The steering system of claim 69 wherein said absolute position sensor further defines one or more electronic signal, where said one or more electronic signal each includes a first level and a second level, and said reference angle is based upon a transition from said first level to said second level of one said electronic signal when said motor is rotating clockwise, and is based upon a transition from said second level to said first level of said one electronic signal when said motor is rotating counterclockwise.

71. The steering system of claim 70 wherein a power-up phase of said electric motor further includes the steps of:

determining an angular interval from said one or more electronic signals from said absolute position sensor;

exciting one or more said winding from said motor according to said determined angular interval; and, controlling said winding currents to be essentially sinusoidal after one of said electronic signals from said absolute position sensor has effected a transition from one of said first and second levels to the other of said first and second levels.

72. The steering system of claim 69 wherein said at least one motor windings of said electric motor is arranged into one or more phases, and said absolute position sensor further comprises one electronic signal for each said motor phase.

73. The steering system of claim 59 wherein said higher-resolution position sensor comprises:

a magnetoresistor;

a toothed track; and said magnetoresistor(s) and toothed track(s) mounted in said motor such that relative rotational motion between said rotor and said stator results in relative rotational motion between said magnetoresistor(s) and said toothed track(s); and wherein said magnetoresistor(s) is disposed sufficiently close to said toothed tracks(s) so as to be effective in detecting said relative motion.

74. The steering system of claim 59 wherein said electric motor system is mounted on the steering column of said motor vehicle.

* * * * *